(12) United States Patent
Woodgate et al.

(10) Patent No.: US 11,422,344 B2
(45) Date of Patent: Aug. 23, 2022

(54) ILLUMINATION APPARATUS

(71) Applicant: Optovate Limited, Oxfordshire (GB)

(72) Inventors: Graham J. Woodgate, Henley-on-Thames (GB); Jonathan Harrold, Upper Heyford (GB)

(73) Assignee: Optovate Limited, Oxfordshire (GB)

( * ) Notice: Subject to any disclaimer, the term of this patent is extended or adjusted under 35 U.S.C. 154(b) by 160 days.

(21) Appl. No.: 16/962,116

(22) PCT Filed: Jan. 11, 2019

(86) PCT No.: PCT/GB2019/050076
§ 371 (c)(1),
(2) Date: Jul. 14, 2020

(87) PCT Pub. No.: WO2019/138243
PCT Pub. Date: Jul. 18, 2019

(65) Prior Publication Data
US 2020/0355896 A1 Nov. 12, 2020

(30) Foreign Application Priority Data

Jan. 14, 2018 (GB) .................................... 1800574

(51) Int. Cl.
*G02B 19/00* (2006.01)
*G02B 17/08* (2006.01)
(Continued)

(52) U.S. Cl.
CPC ........ *G02B 19/0066* (2013.01); *F21V 7/0066* (2013.01); *F21V 7/0083* (2013.01);
(Continued)

(58) Field of Classification Search
CPC ........ F21V 7/0083; F21V 7/28; F21V 7/0066; F21V 7/04; G02B 17/082; G02B 17/0892
See application file for complete search history.

(56) References Cited

U.S. PATENT DOCUMENTS

| 5,184,114 A | 2/1993 | Brown |
| 5,812,105 A | 9/1998 | Ven |

(Continued)

FOREIGN PATENT DOCUMENTS

| CN | 102859268 A | 1/2013 |
| CN | 103117348 A | 5/2013 |

(Continued)

OTHER PUBLICATIONS

CN201880036805.8 Notification of the First Office Action dated Jul. 23, 2021.

(Continued)

*Primary Examiner* — Zheng Song
(74) *Attorney, Agent, or Firm* — Penny L. Lowry

(57) ABSTRACT

A directional illumination apparatus comprises an array of micro-LEDs that may be organic LEDs (OLEDs) or inorganic LEDs and an aligned solid catadioptric micro-optic array arranged to provide a water vapour and oxygen barrier for the micro-LEDs as well as reduced sensitivity to thermal and pressure variations. The shape of the interfaces of the solid catadioptric micro-optic array is arranged to provide total internal reflection for light from the aligned micro-LEDs using known transparent materials. A thin and efficient illumination apparatus may be used for collimated illumination in environmental lighting, display backlighting or direct display.

18 Claims, 25 Drawing Sheets

(51) Int. Cl.
  *F21V 7/04* (2006.01)
  *F21V 7/28* (2018.01)
  *F21V 7/00* (2006.01)

(52) U.S. Cl.
  CPC .................. *F21V 7/04* (2013.01); *F21V 7/28* (2018.02); *G02B 17/082* (2013.01); *G02B 17/0892* (2013.01); *G02B 19/0028* (2013.01)

(56) References Cited

U.S. PATENT DOCUMENTS

| | | | |
|---|---|---|---|
| 6,547,423 B2 | 4/2003 | Marshall et al. | |
| 6,570,324 B1 | 5/2003 | Tutt et al. | |
| 7,014,964 B1 | 3/2006 | Hsu et al. | |
| 7,084,435 B2 | 8/2006 | Sugimoto et al. | |
| 7,171,874 B1 | 2/2007 | Huang | |
| 7,863,614 B2 | 1/2011 | Toyama et al. | |
| 7,994,531 B2 | 8/2011 | Lin et al. | |
| 8,721,115 B2* | 5/2014 | Ing | G09F 13/14 362/241 |
| 8,794,792 B1* | 8/2014 | Moghal | F21V 7/0083 362/240 |
| 9,519,153 B2 | 12/2016 | Robinson et al. | |
| 10,121,772 B1 | 11/2018 | Wu et al. | |
| 10,126,575 B1 | 11/2018 | Robinson et al. | |
| 10,303,030 B2 | 5/2019 | Robinson et al. | |
| 10,533,730 B2 | 1/2020 | Harrold et al. | |
| 2004/0080938 A1 | 4/2004 | Holman et al. | |
| 2004/0089935 A1 | 5/2004 | Lehner | |
| 2004/0126911 A1 | 7/2004 | Kimura | |
| 2004/0161871 A1 | 8/2004 | Omori | |
| 2004/0218390 A1 | 11/2004 | Holman et al. | |
| 2004/0239243 A1 | 12/2004 | Roberts et al. | |
| 2004/0263061 A1 | 12/2004 | Ishikawa et al. | |
| 2005/0111100 A1 | 5/2005 | Mather et al. | |
| 2005/0219693 A1 | 10/2005 | Hartkop et al. | |
| 2006/0152931 A1 | 7/2006 | Holman | |
| 2006/0221611 A1* | 10/2006 | Noh | G02F 1/133605 362/246 |
| 2006/0256255 A1 | 11/2006 | Minami | |
| 2006/0290276 A1 | 12/2006 | Cok et al. | |
| 2007/0007237 A1 | 1/2007 | Wu et al. | |
| 2007/0019131 A1 | 1/2007 | Choi et al. | |
| 2007/0047254 A1 | 3/2007 | Schardt et al. | |
| 2007/0116424 A1 | 5/2007 | Ting et al. | |
| 2007/0165394 A1 | 7/2007 | Chang | |
| 2007/0176195 A1 | 8/2007 | Kuiseko et al. | |
| 2007/0236628 A1* | 10/2007 | Epstein | G02B 5/3058 349/67 |
| 2007/0242477 A1 | 10/2007 | Yoo et al. | |
| 2007/0256453 A1 | 11/2007 | Barnes et al. | |
| 2008/0043466 A1 | 2/2008 | Chakmakjian et al. | |
| 2008/0089093 A1 | 4/2008 | Miller et al. | |
| 2008/0123350 A1 | 5/2008 | Choe et al. | |
| 2008/0225523 A1 | 9/2008 | Samber et al. | |
| 2008/0237612 A1 | 10/2008 | Cok | |
| 2008/0258162 A1 | 10/2008 | Koung et al. | |
| 2008/0315755 A1 | 12/2008 | Han | |
| 2009/0001869 A1 | 1/2009 | Tanimoto et al. | |
| 2009/0073350 A1 | 3/2009 | Toyama et al. | |
| 2009/0086508 A1 | 4/2009 | Bierhuizen | |
| 2009/0109656 A1 | 4/2009 | Chang | |
| 2009/0128735 A1 | 5/2009 | Larson et al. | |
| 2009/0242929 A1 | 10/2009 | Lin | |
| 2009/0268428 A1 | 10/2009 | Tsukada | |
| 2009/0296389 A1 | 12/2009 | Hsu | |
| 2010/0061096 A1 | 3/2010 | Sato | |
| 2010/0097809 A1 | 4/2010 | Munro et al. | |
| 2010/0165635 A1 | 7/2010 | Chen et al. | |
| 2010/0171215 A1 | 7/2010 | Fischer et al. | |
| 2010/0172152 A1 | 7/2010 | Boonekamp | |
| 2010/0195330 A1 | 8/2010 | Schaefer et al. | |
| 2010/0258543 A1 | 10/2010 | Mizuno et al. | |
| 2010/0295762 A1 | 11/2010 | Yeom et al. | |
| 2010/0317132 A1 | 12/2010 | Rogers et al. | |
| 2011/0003410 A1 | 1/2011 | Tsay et al. | |
| 2011/0018860 A1 | 1/2011 | Parry-Jones et al. | |
| 2011/0038150 A1 | 2/2011 | Woodgate et al. | |
| 2011/0090672 A1 | 4/2011 | Zhu et al. | |
| 2011/0151602 A1 | 6/2011 | Speier | |
| 2011/0194034 A1 | 8/2011 | Shimizu | |
| 2011/0255303 A1 | 10/2011 | Nichol et al. | |
| 2012/0086875 A1 | 4/2012 | Yokota | |
| 2012/0119237 A1 | 5/2012 | Leatherdale et al. | |
| 2012/0140462 A1 | 6/2012 | Pickard | |
| 2012/0147296 A1 | 6/2012 | Montgomery et al. | |
| 2012/0258963 A1 | 10/2012 | Berger et al. | |
| 2012/0320627 A1 | 12/2012 | Araki et al. | |
| 2013/0033849 A1 | 2/2013 | Roberts et al. | |
| 2013/0039062 A1 | 2/2013 | Vinther et al. | |
| 2013/0107525 A1 | 5/2013 | Woodgate et al. | |
| 2013/0121000 A1 | 5/2013 | Lee et al. | |
| 2013/0194812 A1* | 8/2013 | Tseng | F21V 29/763 362/355 |
| 2013/0235580 A1* | 9/2013 | Smith | F21V 29/89 362/235 |
| 2013/0258663 A1 | 10/2013 | Woodgate et al. | |
| 2013/0293793 A1 | 11/2013 | Lu | |
| 2014/0022619 A1 | 1/2014 | Woodgate et al. | |
| 2014/0098418 A1 | 4/2014 | Lin | |
| 2014/0140654 A1 | 5/2014 | Brown et al. | |
| 2014/0186979 A1 | 7/2014 | Tu et al. | |
| 2014/0211462 A1 | 7/2014 | Keller et al. | |
| 2014/0211503 A1 | 7/2014 | Tarsa | |
| 2014/0240828 A1 | 8/2014 | Robinson et al. | |
| 2014/0240839 A1 | 8/2014 | Yang et al. | |
| 2014/0299897 A1* | 10/2014 | Zhang | F21V 7/0083 257/88 |
| 2014/0316742 A1* | 10/2014 | Sun | G02B 17/08 702/167 |
| 2015/0054011 A1 | 2/2015 | Koizumi et al. | |
| 2015/0062490 A1 | 3/2015 | Kwon | |
| 2015/0160396 A1 | 6/2015 | Wilcox et al. | |
| 2015/0268479 A1 | 9/2015 | Woodgate et al. | |
| 2015/0268513 A1 | 9/2015 | Chang et al. | |
| 2015/0295154 A1 | 10/2015 | Tu et al. | |
| 2015/0308635 A1 | 10/2015 | Li et al. | |
| 2016/0018077 A1 | 1/2016 | Mallory et al. | |
| 2016/0211413 A1 | 7/2016 | Park et al. | |
| 2016/0299281 A1 | 10/2016 | Robinson et al. | |
| 2017/0031085 A1 | 2/2017 | Lim et al. | |
| 2017/0045666 A1 | 2/2017 | Vasylyev | |
| 2017/0059127 A1 | 3/2017 | Jansma et al. | |
| 2017/0102127 A1* | 4/2017 | Woodgate | H01L 25/0753 |
| 2017/0139114 A1 | 5/2017 | Woodgate et al. | |
| 2017/0154919 A1 | 6/2017 | Chen et al. | |
| 2017/0161179 A1 | 6/2017 | Maple et al. | |
| 2017/0205959 A1 | 7/2017 | Seong | |
| 2017/0219883 A1 | 8/2017 | Yin | |
| 2017/0248289 A1 | 8/2017 | Vasylyev | |
| 2017/0261179 A1 | 9/2017 | Wu et al. | |
| 2018/0014007 A1 | 1/2018 | Brown | |
| 2018/0135831 A1* | 5/2018 | Smith | G02B 19/0061 |
| 2018/0226384 A1 | 8/2018 | Park et al. | |
| 2018/0321553 A1 | 11/2018 | Robinson et al. | |
| 2019/0086706 A1 | 3/2019 | Robinson et al. | |
| 2019/0139243 A1 | 5/2019 | You et al. | |
| 2019/0220121 A1 | 7/2019 | Kim et al. | |
| 2019/0250458 A1 | 8/2019 | Robinson et al. | |
| 2019/0265478 A1 | 8/2019 | Cok et al. | |
| 2019/0278135 A1 | 9/2019 | Woodgate et al. | |
| 2019/0294004 A1 | 9/2019 | Hashimoto | |
| 2019/0377067 A1 | 12/2019 | Han et al. | |
| 2020/0049876 A1 | 2/2020 | Watanabe et al. | |
| 2020/0096171 A1 | 3/2020 | Han et al. | |
| 2020/0159055 A1 | 5/2020 | Robinson et al. | |
| 2020/0166783 A1 | 5/2020 | Roy et al. | |
| 2020/0259307 A1 | 8/2020 | Sharma et al. | |

(56) References Cited

U.S. PATENT DOCUMENTS

| | | | |
|---|---|---|---|
| 2020/0321553 A1 | 10/2020 | Kwon et al. | |
| 2020/0355896 A1 | 11/2020 | Woodgate et al. | |

FOREIGN PATENT DOCUMENTS

| | | | |
|---|---|---|---|
| CN | 105556374 | A | 5/2016 |
| CN | 105849595 | A | 8/2016 |
| CN | 107402475 | A | 11/2017 |
| DE | 102010031945 | A1 | 1/2012 |
| EP | 1387412 | A1 | 2/2004 |
| EP | 1835550 | A2 | 9/2007 |
| EP | 1890343 | A1 | 2/2008 |
| EP | 1986023 | A1 | 10/2008 |
| EP | 2182783 | A2 | 5/2010 |
| EP | 2595295 | A1 | 5/2013 |
| GB | 2464102 | A | 4/2010 |
| GB | 2484711 | A | 4/2012 |
| JP | 2000323755 | A | 11/2000 |
| JP | 2007294411 | A | 11/2007 |
| JP | 2009295309 | A | 12/2009 |
| JP | 2010238846 | A | 10/2010 |
| JP | 2013219397 | A | 10/2013 |
| WO | 2006115313 | A1 | 11/2006 |
| WO | 2007074932 | A1 | 7/2007 |
| WO | 2008109296 | A1 | 9/2008 |
| WO | 2010038025 | A2 | 4/2010 |
| WO | 2010038025 | A3 | 6/2010 |
| WO | 2011131200 | A1 | 10/2011 |
| WO | 2012052722 | A2 | 4/2012 |
| WO | 2012052723 | A1 | 4/2012 |
| WO | 2013064801 | A1 | 5/2013 |
| WO | 2013112435 | A1 | 8/2013 |
| WO | 2014043384 | A1 | 3/2014 |
| WO | 2015089517 | A1 | 6/2015 |
| WO | 2017007770 | A2 | 1/2017 |
| WO | 2018185475 | A1 | 10/2018 |
| WO | 2018185476 | A1 | 10/2018 |
| WO | 2018208618 | A1 | 11/2018 |
| WO | 2019067846 | A1 | 4/2019 |
| WO | 2019107826 | A1 | 6/2019 |

OTHER PUBLICATIONS

CN201880036842.9 Notification of the First Office Action dated Jul. 23, 2021.

International search report and written opinion of international searching authority for PCT application PCT/US2020/050527 dated Feb. 3, 2021.

International search report and written opinion of international searching authority for PCT application PCT/US2020/053825 dated Dec. 30, 2020.

EP18200530.6—European Search Report of the European Patent Office dated May 23, 2019.

International search report and written opinion of international searching authority for PCT application PCT/GB2018/050893 dated Aug. 27, 2018.

International search report and written opinion of international searching authority for PCT application PCT/GB2018/050894 dated Aug. 27, 2018.

International search report and written opinion of international searching authority for PCT application PCT/GB2019/050076 dated May 9, 2019.

International search report and written opinion of international searching authority for PCT application PCT/US2019/021570 dated May 24, 2019.

International search report and written opinion of international searching authority for PCT application PCT/US2019/031526 dated Jul. 29, 2019.

International search report and written opinion of international searching authority for PCT application PCT/US2020/040686 dated Nov. 20, 2020.

International search report and written opinion of international searching authority for PCT application PCT/US2020/047383 dated Dec. 4, 2020.

International search report and written opinion of international searching authority for PCT application PCT/US2020/050460 dated Dec. 8, 2020.

International search report and written opinion of international searching authority for PCT application PCT/US2020/053864 dated Dec. 14, 2020.

CN201980016364.X Notification of the First Office Action dated Dec. 27, 2021.

International search report and written opinion of international searching authority for PCT application PCT/US2021/018544 dated Apr. 29, 2021.

EP19804311.9—Extended European Search Report of the European Patent Office dated Dec. 15, 2021.

CN201980030275.0 Notification of the First Office Action dated Mar. 4, 2022.

* cited by examiner

ILLUMINATION APPARATUS

TECHNICAL FIELD

The present disclosure relates to an apparatus comprising a plurality of addressable light-emitting elements aligned to a plurality of optical elements arranged as a solid layer. Such an apparatus may be used for switchable environmental lighting, for switchable indoor or outdoor electronic display screens, or for a switchable backlight to an LCD display.

BACKGROUND

Displays with wide directional light output distributions are typically used to achieve comfortable display viewing from many different viewing angles. Such displays are desirable for multiple users to share image content, and for displays where the viewing position is not substantially fixed in relation to the display centreline.

By way of comparison displays with narrow directional light output distributions are typically used to provide image data for the eyes of users over reduced viewing angles. Such displays are typically used to achieve privacy display (where images that may be seen by snoopers are suppressed), night time display (where ambient illumination is suppressed—for example to reduce reflections from windscreens or to reduce unsociable stray light), low power viewing (where illumination is not supplied to regions away from the eyes of users) and outdoors viewing (where high luminance is provided to a narrow range of viewing positions for no or small increases in backlight power).

In a known method, narrow directional light output distributions can be achieved by the addition of a micro louvered film. Such films can be permanently fixed on display such as for ATM cash machines for privacy viewing or automotive displays for night time operation. Alternatively, such films may be manually placed on the surface of a conventional wide directional light output distribution display by the user for private display use and removed and stored to restore a normal wide-angle viewing. Micro louver films are inefficient because they work by absorbing light from the backlight in the unwanted display angular directions. As a side effect of construction, they also significantly attenuate of the light in the wanted direction.

The viewing angle of a transmissive spatial light modulator such as an LCD (liquid crystal display) is controlled by the output light distribution of a backlight and the angular transmission properties of the LCD panel used. Typically, the backlight incorporates a light guide plate (LGP) that accepts light from sources such as LEDs (light emitting diodes) arranged at an input edge of the LGP. A structured pattern on the LGP output face provides a defined leakage of light across its face as the light propagates through the LGP.

Other known backlights incorporate an array of light emitting diodes (LEDs) in a matrix behind the LCD. The light from the LEDs is strongly diffused to create a largely uniform backlight illumination. The directional light output distribution of light from the backlight, or directional light output distribution, can be altered by the addition of fixed layers such as prismatic films and diffusers within the backlight assembly. The backlight and therefore the display angular light directional light output distribution is fixed by design at the time of manufacture.

Illumination systems for environmental lighting such as automobile headlights, architectural, commercial or domestic lighting may provide a narrow directional light output distribution, for example by means of focusing optics to provide spotlighting effects, or can achieve a wide directional light output distribution for example by means of diffusing optics to achieve broad area illumination effects.

Inorganic LEDs formed using semiconductor growth onto monolithic wafers demonstrate high levels of luminous efficiency (1 m/W) and high luminous emittance (1 m/mm$^2$). In cooperation with light conversion layers, LEDs may provide acceptable CIE Colour Rendering Indices (CRI) or colour space coverage.

Organic light-emitting diodes (OLEDs) can be formed on arbitrarily large substrates; however luminous emittance may be more than 1000 times lower than may be achieved by inorganic LEDs.

In this specification LED refers to (i) an unpackaged inorganic LED die chip extracted directly from a monolithic wafer, i.e. a semiconductor element —this is different from packaged LEDs which have been attached to a lead frame in order to provide electrodes and may be assembled into a plastic package to facilitate subsequent assembly; or (ii) OLED elements that are formed by patterned deposition methods including ink jet printing, contact printing, evaporation through fine metal mask or vertical plane sources and may comprise quantum dot materials.

Packaged LEDs are typically of dimension greater than 1 mm, and more typically of dimension greater than 3 mm and can be assembled by conventional Printed Circuit Board assembly techniques including pick and place methods. The accuracy of components placed by such assembly machines may typically be about plus or minus 30 microns. Such sizes and tolerances prevent application to very high-resolution displays.

Micro-LEDs may be formed by array extraction methods in which multiple LEDs are removed from a monolithic wafer in parallel and may be arranged with positional tolerances that are less than 5 microns. Micro-LEDs may also or alternatively comprise OLED elements.

White LED lighting sources can be comprised of separate spectral bands such as red, green, blue and yellow, each created by a separate LED element. Such sources enable users to resolve the separate colours, and as a result of the separation of the sources in the lamp, can create coloured illumination patches. It would be desirable if the sources were homogenized so that their separation was less than the visual resolution limit.

BRIEF SUMMARY

Directional LED elements can use reflective optics (including total internal reflective optics) or more typically catadioptric optic type reflectors, as described for example in U.S. Pat. No. 6,547,423. Catadioptric elements employ both refraction and reflection, which may be total internal reflection or reflection from metallised surfaces.

It would be desirable to provide a directional display comprising an array of catadioptric optical elements and an array of Micro-LEDs that is resistant to gas such as oxygen and water vapour ingress, thermal variations and changes in external pressure while providing illumination quality suitable for directional applications including directional displays such as privacy displays.

According to a first aspect of the present disclosure there is provided an illumination apparatus, comprising: a plurality of LEDs, the plurality of LEDs being arranged in an LED array, wherein the LEDs of the plurality of LEDs are micro-LEDs; a catadioptric optical structure aligned with the LEDs of the plurality of LEDs to provide a directional light output distribution, the directional light output distribution being of light output from the LEDs of the plurality of LEDs; wherein the catadioptric optical structure comprises a plurality of catadioptric optical elements arranged in a catadioptric optical element array, each of the catadioptric optical elements of the plurality of catadioptric optical elements aligned in correspondence with a respective one or more of the LEDs of the plurality of LEDs, each of the LEDs of the plurality of LEDs being aligned with only a respective one of the catadioptric optical elements of the catadioptric optical structure; wherein each of the plurality of catadioptric optical elements comprises in at least one catadioptric cross-sectional plane through its optical axis: a first cross-sectional outer interface and a second cross-sectional outer interface facing the first cross-sectional outer interface; wherein the first and second cross-sectional outer interfaces each comprise curved interfaces comprising first and second outer interface regions; wherein the first and second cross-sectional outer interfaces extend from a first end of the catadioptric optical element to a second end of the catadioptric optical element, the second end of the catadioptric optical element facing the first end of the catadioptric element; wherein the distance between the first and second cross-sectional outer interfaces at the first end of the catadioptric optical element is less than the distance between the first and second cross-sectional outer interfaces at the second end of the catadioptric optical element; and at least one transparent inner interface arranged between the first and second ends and between the first and second outer interfaces; wherein the catadioptric optical structure comprises: (i) a first transparent non-gaseous material with a first refractive index arranged between the first and second cross-sectional outer interfaces and the at least one transparent inner interface and between the first and second end of each of the catadioptric optical elements; (ii) a second transparent non-gaseous material with a second refractive index lower than the first refractive index arranged between a respective aligned LED and the transparent inner interface of each of the catadioptric optical elements; (iii) a third transparent non-gaseous material with a third refractive index lower than the first refractive index arranged between the first cross-sectional outer interface of a first catadioptric optical element and the second cross-sectional outer interface of an adjacent catadioptric optical element of the plurality of catadioptric optical elements and between the first and second end of each of the catadioptric optical elements.

The tilt angle with respect to the optical axis of the interface normal of each of the first and second cross-sectional outer interfaces may vary continuously with the distance from the first end towards the second end. The derivative of the tilt angle with respect to distance from the optical axis may have a discontinuity at the boundary between the respective first and second outer interface regions of the first and second cross-sectional outer interfaces.

Advantageously a directional illumination apparatus may be provided that can provide a restricted range of illumination directions. Privacy display, power savings, reduced stray light for night time operation and efficient high luminance operation may be achieved. Further oxygen and moisture ingress may be reduced and LED lifetime increased. Uniformity degradation due to thermal expansion differences minimised Misalignments due to environmental pressure changes may be reduced. Further, low cost materials may be provided.

The height from the first end of the first and second outer interfaces may increase monotonically between the first and second end of the catadioptric optical element; and the tilt angle with respect to the optical axis of the interface normal of each of the first and second cross-sectional outer interfaces may increase monotonically between the first and second end of each catadioptric optical element. Advantageously uniform angular optical beam profiles may be provided.

Principal light output rays from the respective aligned LEDs may be provided at the first end and at the optical axis of the respective catadioptric optical element, and may be transmitted through an inner interface, and may be incident on a cross-sectional outer interface, each principal light ray having an angle of incidence at the curved cross-sectional outer interface; wherein the derivative of the difference between the angle of incidence of each principal light ray and the critical angle at the first and second outer interfaces with respect to distance from the optical axis has a discontinuity at the boundary between the first and second outer interface regions. Advantageously a directional illumination apparatus may be provided that can provide a restricted range of illumination directions.

The difference between the angle of incidence of each principal light ray and the critical angle may be a constant across the first outer interface region and the difference between the angle of incidence of each principal light ray and the critical angle monotonically may increase across the second outer interface region. Advantageously the angular width of the optical profile from the catadioptric optical element may be minimised.

The first outer interface region is arranged to reflect principal light output rays in off-axis directions and the second outer interface region is arranged to reflect principal light output rays in on-axis directions. Advantageously the angular width of the optical profile from the catadioptric optical element may be minimised Privacy appearance to snoopers may be reduced and stray light may be minimised.

The principal rays may be reflected by total internal reflection at the cross-sectional outer interfaces between the first and second end of each catadioptric optical element. Advantageously efficiency may be optimised in comparison to arrangements using coated optical elements. Further manufacturing yield may be increased and cost reduced.

In the first outer interface region, reflected principal light rays may be output through the second end in directions different to the optical axis direction and in the second outer interface region reflected principal light rays may be output through the second end substantially parallel to the optical axis. The first outer interface region may be arranged between the first end and the second outer interface region and the second outer interface region is arranged between the second end and the first outer interface region. Advantageously the angular width of the optical profile from the catadioptric optical element may be minimised.

The third transparent material may be arranged to fill the region between the first cross-sectional outer interface of a first catadioptric optical element and the second cross-sectional outer interface of an adjacent catadioptric optical element of the plurality of catadioptric optical elements and between the first and second end of the respective catadioptric optical elements. The third transparent material may be formed as a layer on the first and second cross-sectional outer interfaces of the plurality of catadioptric optical elements. A filler material with a fourth refractive index different to the third refractive index may be arranged to fill the region between the third transparent material formed as a layer on the first and second cross-sectional outer interfaces. Advantageously the volume of very low refractive index materials may be reduced and cost reduced; and the angular width of the optical profile from the catadioptric optical element may be minimised.

Gas and/or water vapour barrier layers are formed between the plurality of LEDs and outer surfaces of the illumination apparatus. Advantageously oxygen and moisture ingress may be reduced and LED lifetime increased.

The micro-LEDs may be organic LEDs. Advantageously device thickness and complexity are reduced in comparison to backlit LCDs.

The LEDs may be from a monolithic wafer arranged in an array with their original monolithic wafer positions and orientations relative to each other preserved; and wherein in at least one direction, for at least one pair of the plurality of LEDs in the at least one direction, for each respective pair there was at least one respective LED in the monolithic wafer that was positioned in the monolithic wafer between the pair of LEDs in the at least one direction and that is not positioned between them in the array of LEDs. Advantageously very high luminance illumination apparatuses may be provided.

The LEDs of the plurality of LEDs are micro-LEDs of width or diameter may be less than 200 microns, preferably less than 100 microns and more preferably less than 50 microns. Advantageously a very high-resolution display may be provided.

In the at least one catadioptric cross-sectional plane the distance between the first and second outer interfaces at the second end of the catadioptric optical element may be less than less than 600 microns, preferably less than 400 microns and more preferably less than 200 microns. Advantageously very low thickness may be provided.

The first refractive index may be greater than 1.49, preferably greater than 1.55 and most preferably greater than 1.58 and the third refractive index may be less than 1.42, preferably less than 1.40 and most preferably less than 1.35. Advantageously known and low cost materials may be used to form the catadioptric optical elements.

In the at least one catadioptric cross-sectional plane at least one of the transparent inner interfaces may have positive optical power. Advantageously light may be efficiently directed from the LED and therefore from the illumination apparatus.

According to a second aspect of the present disclosure a direct display apparatus comprises a switchable illumination apparatus of the first aspect and a control circuit comprising means to drive the plurality of LEDs with image pixel data. Advantageously thin directional displays may be provided that are resistant to thermal, oxygen, water vapour and environmental pressure changes. Further such displays may be conveniently formed on flexible and curved substrates.

According to a third aspect of the present disclosure a backlit display apparatus comprises the illumination apparatus of the first aspect and a spatial light modulator. Advantageously thin directional LCDs may be provided that are resistant to thermal, oxygen, water vapour and environmental pressure changes. Further such displays may be conveniently formed on flexible and curved substrates.

Such an apparatus may be used for domestic or professional lighting and for display.

These and other features and advantages of the present disclosure will become apparent to those of ordinary skill in the art upon reading this disclosure in its entirety.

BRIEF DESCRIPTION OF THE DRAWINGS

Embodiments are illustrated by way of example in the accompanying figures, wherein like reference numbers indicate similar parts.

DETAILED DESCRIPTION

It would be desirable to provide an illumination apparatus for display, display backlighting or for domestic or professional environmental lighting that provides light output directionality over a restricted solid angle, that is, non-Lambertian illumination. Such an illumination apparatus in display applications may provide privacy functionality in which an off-axis snooper may be unable to resolve image content while an on-axis viewer may have a conventional display appearance. Further such a directional display may provide reduced power consumption as power is not required to illuminate off-axis observers. Further such a display may provide reduced stray light in night time operation, for example in automotive applications. Further such a display may provide very high luminance levels without increasing the power consumption in comparison to a wide-angle display at conventional luminance levels.

Environmental lighting may include illumination of a room, office, building, scene, street, equipment, or other illumination environment. Such an illumination apparatus may provide narrow angle lighting of the illuminated environment, such as spot lighting.

In the present disclosure display backlighting means an illumination apparatus arranged to illuminate a transmissive spatial light modulator such as a liquid crystal display. The backlight may provide uniform luminance across the spatial light modulator and pixel data is provided by the spatial light modulator. The micro-LEDs of a display backlight may further be provided with some pixel information, for example in high dynamic range operation.

Direct display means an illumination apparatus wherein the micro-LEDs are arranged to provide pixel image information, and no spatial light modulator is arranged between the illumination apparatus and observer.

It would be desirable to provide directional displays that achieve encapsulation of light emitting elements to provide enhanced environmental ruggedness in comparison to catadioptric optical elements that provide refractive and reflective surfaces in air.

The structure of an illumination apparatus comprising a solid catadioptric structure will now be described.

Figure 1A:
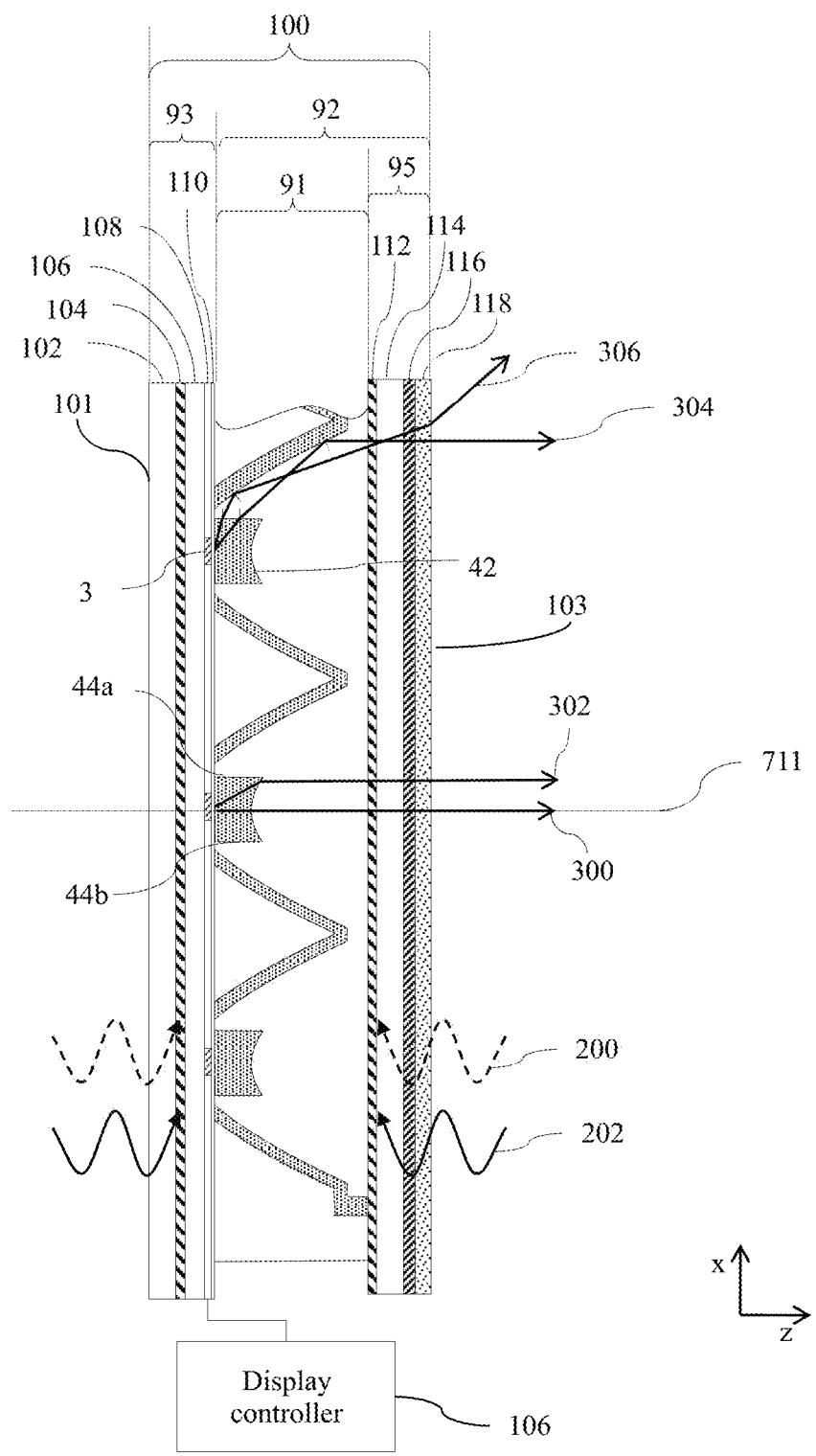
FIG. 1A is a schematic diagram illustrating in top view a directional display apparatus comprising an array of solid catadioptric optical elements and an array of LEDs.
Figure 1B:
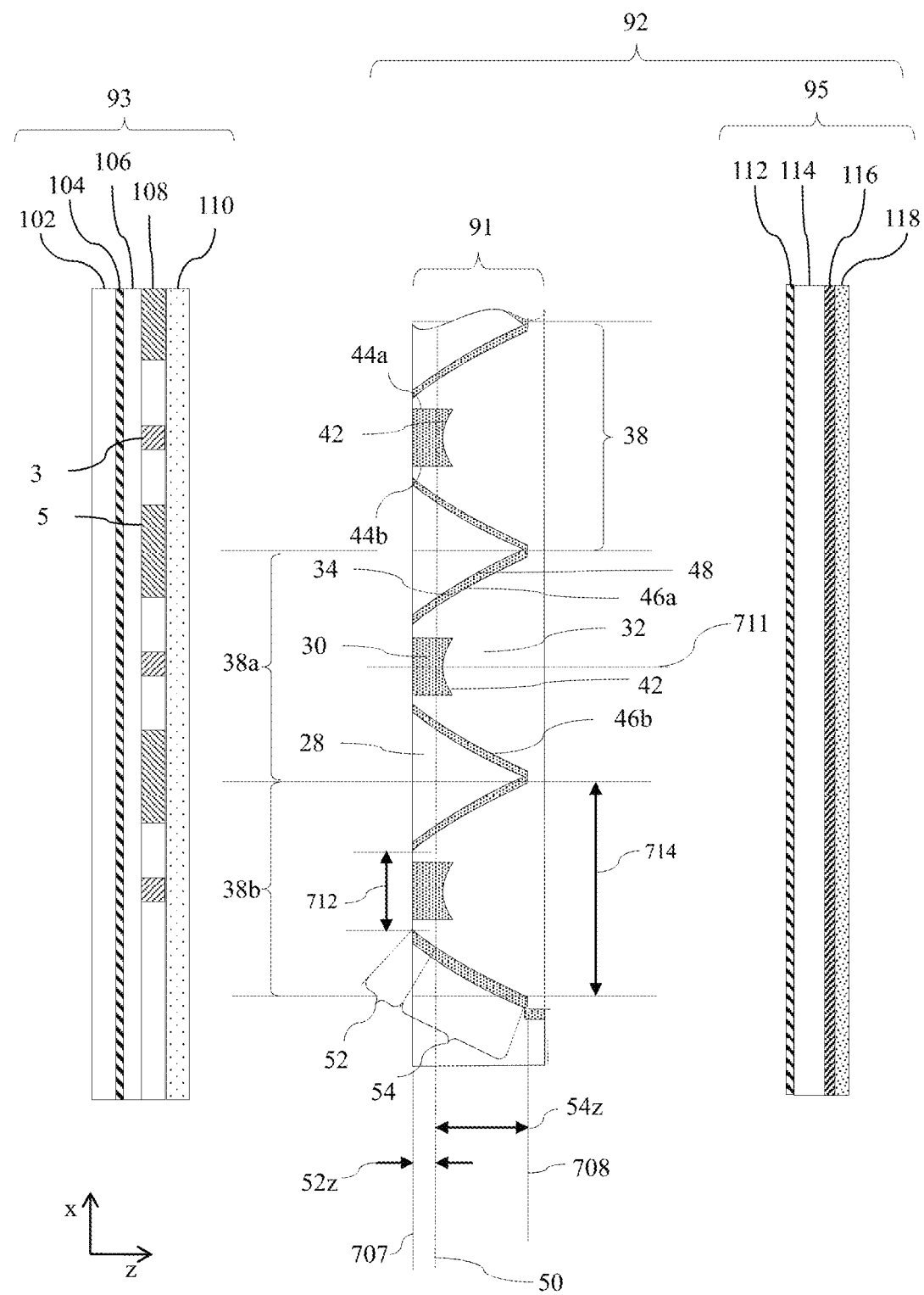
FIG. 1B is a schematic diagram illustrating in top view separated components of FIG. 1A.

FIG. 1A is a schematic diagram illustrating in top view a directional display apparatus 100 comprising an array of solid catadioptric optical elements and an array of LEDs 3; and FIG. 1B is a schematic diagram illustrating in top view separated components of FIG. 1A. Features of the arrangements of FIG. 1B not discussed in further detail may be assumed to correspond to the features with equivalent reference numerals in FIG. 1A, including any potential variations in the features.

An illumination apparatus 100 comprises a plurality of LEDs 3, the plurality of LEDs 3 being arranged in an LED array, wherein the LEDs of the plurality of LEDs are micro-LEDs.

The catadioptric optical structure 91 comprises a plurality of catadioptric optical elements 38a, 38b arranged in a catadioptric optical element array, each of the catadioptric optical elements 38 of the plurality of catadioptric optical elements 38 aligned in correspondence with a respective one or more of the LEDs 3 of the plurality of LEDs, each of the LEDs 3 of the plurality of LEDs 3 being aligned with only a respective one of the catadioptric optical elements 38 of the catadioptric optical structure 91.

Each of the plurality of catadioptric optical elements 38 comprises in at least one catadioptric cross-sectional plane through its optical axis 711, a first cross-sectional outer interface 46a and a second cross-sectional outer interface 46b facing the first cross-sectional outer interface 46a; wherein the first and second cross-sectional outer interfaces 46a, 46b each comprise curved interfaces comprising first and second outer interface regions 52, 54. The outer interfaces 46a, 46b are between different solid materials 32, 34.

The first and second cross-sectional outer interfaces 46a, 46b extend from a first end 707 of the catadioptric optical element 38 to a second end 708 of the catadioptric optical element 38, the second end 708 of the catadioptric optical element facing the first end 707 of the catadioptric element 38.

The distance 712 between the first and second cross-sectional outer interfaces 46a, 46b at the first end of the catadioptric optical element 38 is less than the distance 714 between the first and second cross-sectional outer interfaces 46a, 46b at the second end of the catadioptric optical element 38. As will be described below, reduced cone angle can be used for the output directional distribution 120.

At least one transparent inner interface 42, 44a, 44b is arranged between the first and second ends 712, 714 and between the first and second outer interfaces 46a, 46b.

The catadioptric optical structure 91 comprises: (i) a first transparent non-gaseous material 32 with a first refractive index arranged between the first and second cross-sectional outer interfaces 46a, 46b and the at least one transparent inner interface 42, 44a, 44b and between the first and second end 712, 714 of each of the catadioptric optical elements 38; (ii) a second transparent non-gaseous material 30 with a second refractive index lower than the first refractive index arranged between a respective aligned LED 3 and the transparent inner interface 42, 44a, 44b of each of the catadioptric optical elements 38; (iii) a third transparent non-gaseous material 34 with a third refractive index lower than the first refractive index arranged between the first cross-sectional outer interface 46b of a first catadioptric optical element 38a and the second cross-sectional outer interface 46a of an adjacent catadioptric optical element 38b of the plurality of catadioptric optical elements 38 and between the first and second end 707, 708 of each of the catadioptric optical elements 38.

For the purposes of the present disclosure, the materials 30, 32, 34, 28 are solid, which may also include gels.

The first refractive index may be greater than 1.49, preferably greater than 1.55 and most preferably greater than 1.58. The third refractive index may be less than 1.42, preferably less than 1.40 and most preferably less than 1.35, as will be described in further detail below for illustrative embodiments. Example materials may include but are not limited to polymers such as acrylates for the first material 32; and fluorinated materials and/or silicone materials for the second and third materials 30, 34.

Alternatively, some of the materials 30, 32, 34, 28 may be liquid, for example the material 28 may comprise a liquid material. Suitable low index liquid materials include silicone liquids.

As illustrated in FIGS. 1A and 1B the third transparent material 34 may be formed as a layer on the first and second cross-sectional outer interfaces 46a, 46b of the plurality of catadioptric optical elements 38 and may not fill the region between the interfaces 46a, 46b.

A filler material 28 with a fourth refractive index different to the third refractive index may further be arranged to fill the region between the third transparent material 34 formed as a layer on the first and second cross-sectional outer interfaces 46a, 46b. Low index materials 34 such as those using fluorinated materials may be expensive, and further the optical operation to provide total internal reflection within the interfaces 46a, 46b may be achieved by thin layers. Advantageously desirable optical operation may be achieved with reduced cost in comparison to arrangements in which the material 34 fills the region between the outer interfaces 46a, 46b.

Such material 28 may be transparent so that light from a second plurality of LEDs 5 that are arranged between the first plurality of LEDs 3 may be transmitted to advantageously provide a wide-angle mode of operation as will be described below. Alternatively, the material 28 may be absorptive to achieve reduced stray light between adjacent pixels of a display apparatus.

It would be desirable to provide a directional display apparatus with low thickness and high resolution. In illustrative embodiments, the at least one catadioptric cross-sectional plane the distance 714 between the first and second outer interfaces 46a, at the second end of the catadioptric optical element 38 may be less than less than 600 microns, preferably less than 400 microns and more preferably less than 200 microns. The LEDs 3 of the plurality of LEDs may be micro-LEDs of width or diameter is less than 200 microns, preferably less than 100 microns and more preferably less than 50 microns.

As illustrated in FIG. 1A, the transparent inner interface 42 may have positive optical power such that light rays 300, 302 are directed in substantially on-axis directions from the location of the micro-LED 3 that intersects the optical axis 711. As will be described below, the inner interfaces 44a, 44b may be linear and be illuminated by rays 304, 306.

Further elements related to the construction of the illumination apparatus of FIG. 1A will now be described. Illumination apparatus 100 may be provided by backplane substrate 93 and catadioptric array 92 comprising catadioptric optical structure 91 and catadioptric substrate 95.

Backplane substrate 93 may comprise a support substrate 102, a barrier layer 104, LED support substrate 106, LED layer 108 and adhesive layer 110. Catadioptric substrate 95 may comprise barrier layer 112, support layer 114, anti-reflection layer 116 that may comprise components such as retarders and polarisers arranged to reduce reflections of ambient light from the display and optical elements. An outer optical diffusing layer 118 may be provided to achieve increased uniformity of directional output.

Materials used in substrates 93, 95 may be flexible to advantageously achieve a flexible display.

Gas and/or water vapour barrier layers 104, 112 may be formed between the plurality of LEDs 3 and outer surfaces 101, 103 of the illumination apparatus 100. Barrier layers 104, 112 may be arranged to reduce ingress of water vapour 202 and oxygen 200 that may degrade optical output and lifetime of the LEDs 3, in particular in embodiments in which the LEDs 3 comprise organic LED materials.

In operation as a direct display, a control circuit 106 comprising means to drive the plurality of LEDs 3 with image pixel data may be provided.

Figure 1C:
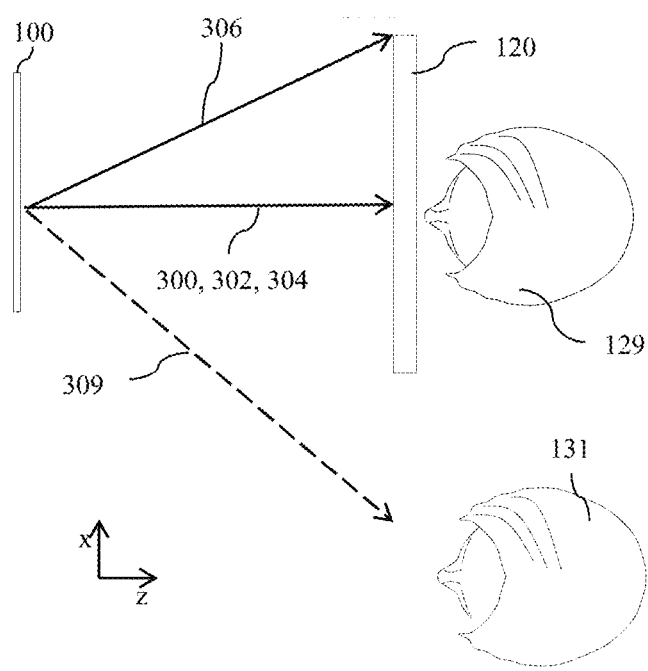
FIG. 1C is a schematic diagram illustrating illumination by the directional display of FIG. 1A an observer and a snooper.

FIG. 1C is a schematic diagram illustrating in top view illumination by the directional display 100 of FIG. 1A of a display user 129 and an off-axis snooper 131. Desirably the snooper 131 cannot see an image on the display 100 when the display operates in privacy mode of operation.

As illustrated in FIGS. 1A-B, catadioptric optical structure 91 is aligned with the LEDs 3 of the plurality of LEDs 3 to provide a directional light output distribution 120 as illustrated in FIG. 1C, the directional light output distribution 120 being of light output from the LEDs 3 of the plurality of LEDs.

As illustrated in FIG. 1C, the light rays 300, 302, 304 illustrated in FIG. 1A may be directed towards the centre of the illumination region 120 such that observer 129 can observe an illuminated display. Similarly, off-axis rays 306 are directed from the edge of the LED 3 towards the illumination region 120.

However, the luminance of high angle rays 309 is substantially lower so that the off-axis snooper 131 cannot see the display 100. Advantageously the display 100 may operate as a privacy display, or a power saving display for the user 129.

Returning to FIG. 1A, further LEDs 5 that may be micro-LEDs may be provided outside a first end of the catadioptric optical structure 91 to achieve switching to a wider viewing angle of operation as will be described below. In operation, such LEDs 5 provide luminance in the direction of light ray 309 such that an off-axis user can observe an image on the display 100. Control of the LEDs 5 may advantageously provide a switchable privacy display 100.

Figure 1D:
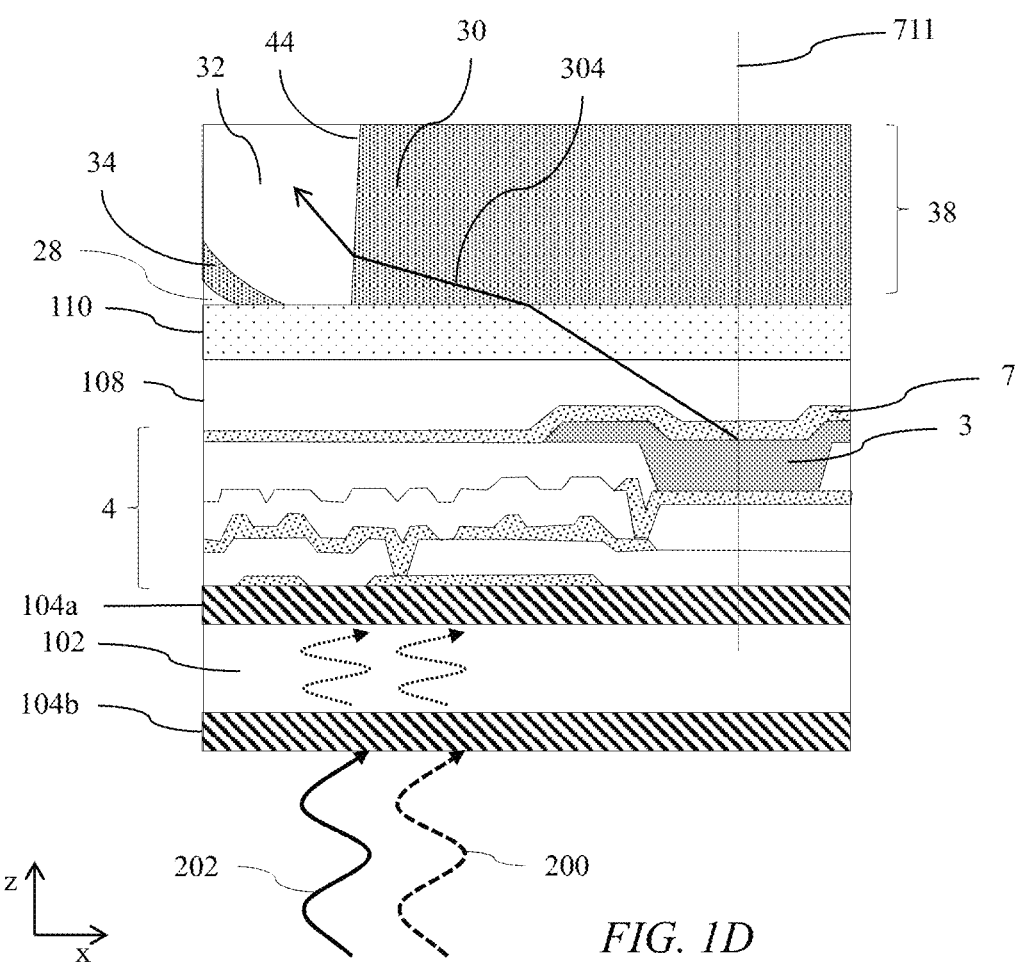
FIG. 1D is a schematic diagram illustrating in top view a detail of the arrangement of an organic LED and aligned solid catadioptric optical element.

FIG. 1D is a schematic diagram illustrating in top view a detail of the arrangement of an organic LED and aligned solid catadioptric optical element 38. Barrier layer 104 may comprise two layers 104a, 104b, for example an organic material and an inorganic material, arranged to minimise water vapour 202 and oxygen 200 ingress through substrate 102. Transistor 4 with electrodes 7 may be used to provide addressing control of light emitting pixel 3 and layer 108 provides encapsulation and planarization of the OLED emitter LED 3. Adhesive 110 is arranged to provide attachment to the catadioptric optical element 38 such that light rays 304 are directed into the catadioptric optical element 38. Barrier layer 112 may also comprise multiple layers of different materials that may be a combination of organic and inorganic materials.

Advantageously the present embodiments achieve encapsulation of the OLED emitter by means of the solid catadioptric optical element 38 that has interfaces 46a, 46b arranged to achieve directional illumination with low levels of cross talk to snoopers as will be described below.

Figures 1E, 1F, 1G:
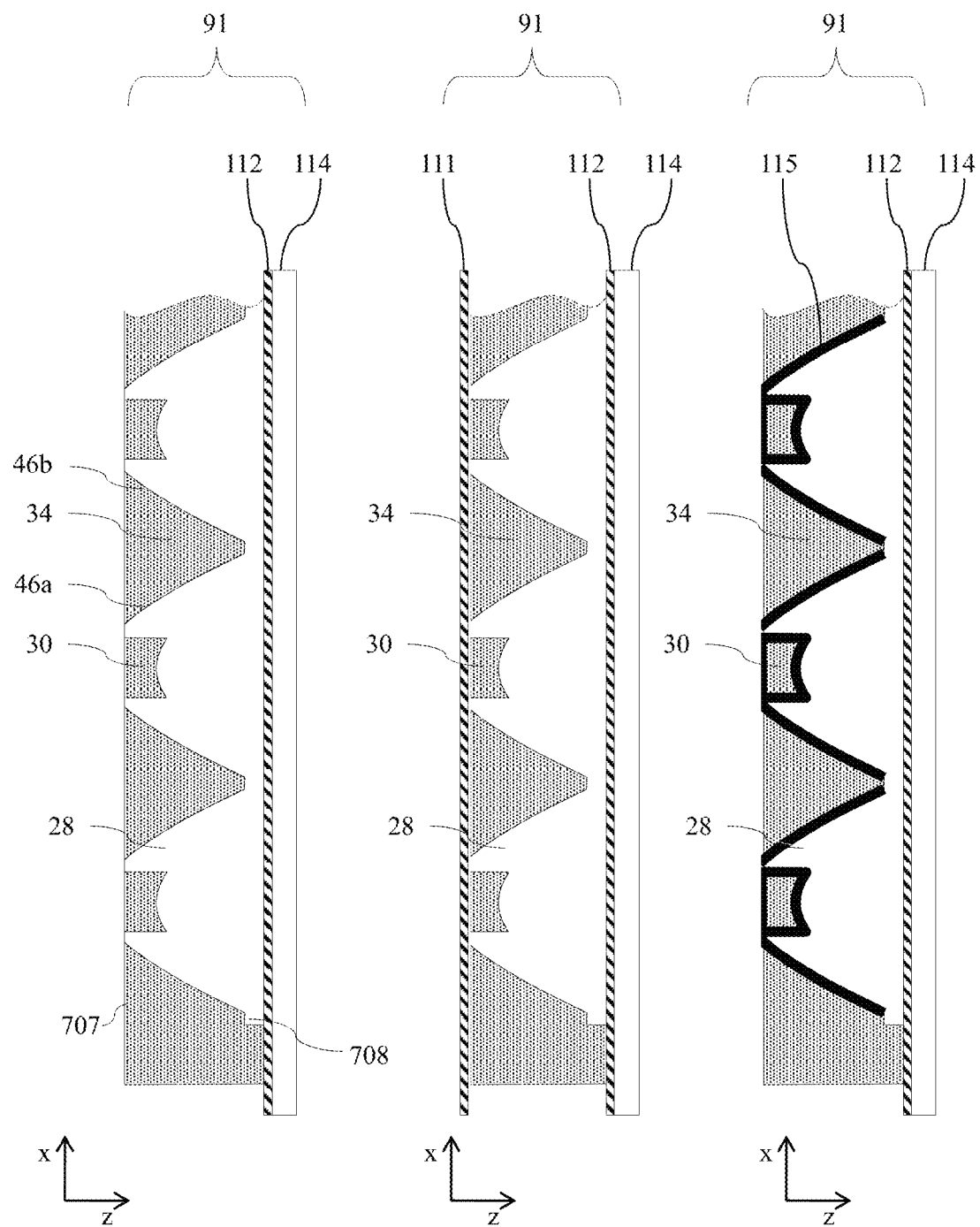
FIGS. 1E-G are schematic diagrams illustrating in top view details of the arrangement of solid catadioptric optical elements.

FIGS. 1E-G are schematic diagrams illustrating in top view details of the arrangement of further structures for solid catadioptric optical elements 38. In these embodiments the third transparent material 34 is arranged to fill the region between the first cross-sectional outer interface 46a of a first catadioptric optical element and the second cross-sectional outer interface 46b of an adjacent catadioptric optical element 38b of the plurality of catadioptric optical elements 38 and between the first and second ends 707, 708 of the respective catadioptric optical elements 38. Features of the arrangements of FIGS. 1E-G not discussed in further detail may be assumed to correspond to the features with equivalent reference numerals as discussed above, including any potential variations in the features.

FIG. 1E illustrates that barrier layer 112 may be provided on the substrate 114. Conveniently the substrate may be provided prior to fabrication of the catadioptric optical structure 91.

FIG. 1F illustrates that a further barrier layer 111 may be formed on the solid catadioptric optical structure 91 after fabrication. Advantageously multiple barrier layers, for example double barrier layers may be provided to further reduce water vapour 202 and oxygen 200 ingress.

FIG. 1G illustrates a further embodiment wherein a barrier layer 115 is formed on the material 28 of the catadioptric optical structure 91 prior to addition of the low index materials 30, 34. Advantageously the material properties and resistance to high temperature processing that may be desirable for barrier layers such as inorganic material evaporation may be improved and increased yield achieved while providing increased resistance to water vapour 202 and oxygen 200 ingress. Barrier layers 111, 112 may also be provided as barriers to other gases or vapours.

The design of cross-sectional outer interfaces 46 of solid catadioptric optical elements 38 to achieve directional output with low off axis stray light will now be described by considering the propagation of principal light rays.

Figure 2A:
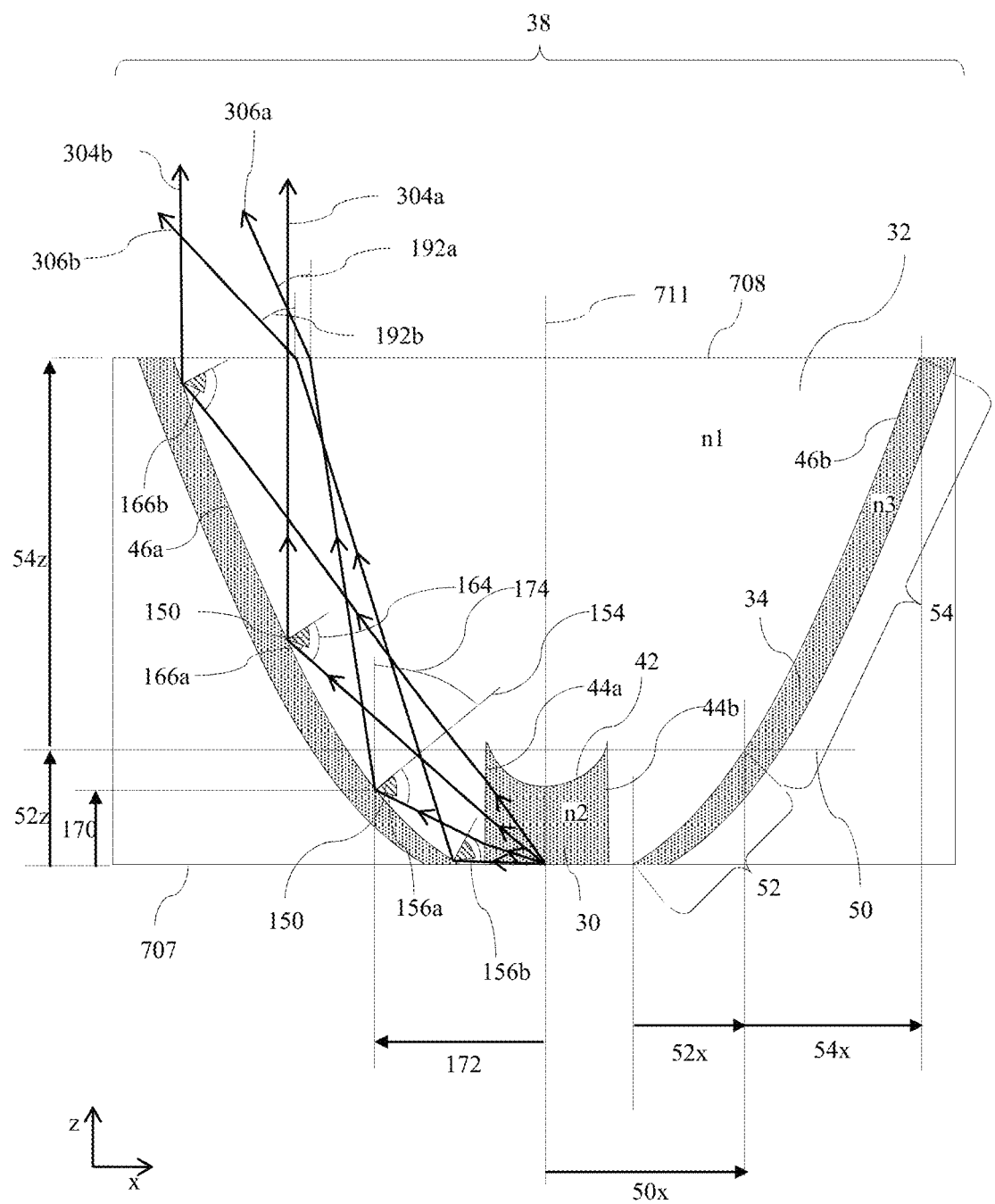
FIG. 2A is a schematic diagram illustrating in side view propagation of principal light rays from a light source at the optical axis of a solid catadioptric optical element comprising a low index material coating.

FIG. 2A is a schematic diagram illustrating in side view propagation of principal light rays from a light source comprising LED 3 at the optical axis 711 of a solid catadioptric optical element 38. Features of the arrangements of FIG. 2A not discussed in further detail may be assumed to correspond to the features with equivalent reference numerals as discussed above, including any potential variations in the features.

Principal light output rays 304a, 304b, 306a, 306b from the respective aligned LEDs 3 are provided at the first end 707 and at the optical axis 711 of the respective catadioptric optical element 38, are transmitted through an inner interface 44a, and are incident on a cross-sectional outer interface 46a, each principal light ray 304a, 304b, 306a, 306b having an angle of incidence 164 at the curved cross-sectional outer interface 46a with respect to the surface normal 154 that has a tilt angle 174 with respect to the direction of the optical axis 711. The principal rays are reflected by total internal reflection at the cross-sectional outer interfaces 46a, 46b between the first and second end 707, 708 of each catadioptric optical element 38.

The first outer interface region 52 is arranged between the first end 707 and the second outer interface region 54 and the second outer interface region 54 is arranged between the second end 708 and the first outer interface region 52. Outer interface regions 52 and 54 are regions of the outer interface 46. For illustrative purposes regions 52, 54 have widths 52x, 54x respectively in the plane comprising the optical axis 711; and regions 52, 54 have heights 52z, 54z respectively in the plane comprising the optical axis 711. The regions 52, 54 of the outer interface 46 meet at boundary 50 that has lateral location 50x from the optical axis and height that may be the same as the height 52z of the region 52.

In the first outer interface region 52, reflected principal light rays 306a, 306b from the LED 3 at the optical axis 711 are output through the second end 708 in directions different to the optical axis direction 711 and in the second outer interface region 54 reflected principal light rays 304a, 304b are output through the second end 708 substantially parallel to the optical axis 711.

In the first outer interface region 52, the surface normal tilt angle 174 is arranged to reflect principal light output rays 306a, 306b in off-axis directions with angles 192 that are not substantially parallel to the optical axis 711 direction. Thus, the rays 306a, 306b are reflected by means of total internal reflection, that is the angle of incidence is greater than the critical angle, illustrated by cone 150 for each incidence location at the cross-sectional outer interface 46a.

The second outer interface region may be arranged to reflect principal light output ray directions that are on-axis or close to on-axis for principal rays 304a, 304b, that is parallel to the optical axis 711 direction. The rays 304a, 304b may further be arranged with small variations from the on-axis direction, for example within 10 degrees of the on-axis direction. Advantageously a comfortable viewing freedom and display uniformity may be achieved across the display 100 for observer 129 illustrated in FIG. 1C.

By way of comparison at least some of the rays 306a, 306b may have angles 192 that are at greater angles than 10 degrees with known and low-cost materials top provide first, second and third refractive indices.

Thus the angular difference 156a, 156b between the angle of incidence 164 and critical angle for principal rays 306a, 306b has a different relationship in the first outer interface region 52 than in the second outer interface region 54 as will be further described below.

Further arrangements of catadioptric optical elements 38 will now be described.

Figure 2B:
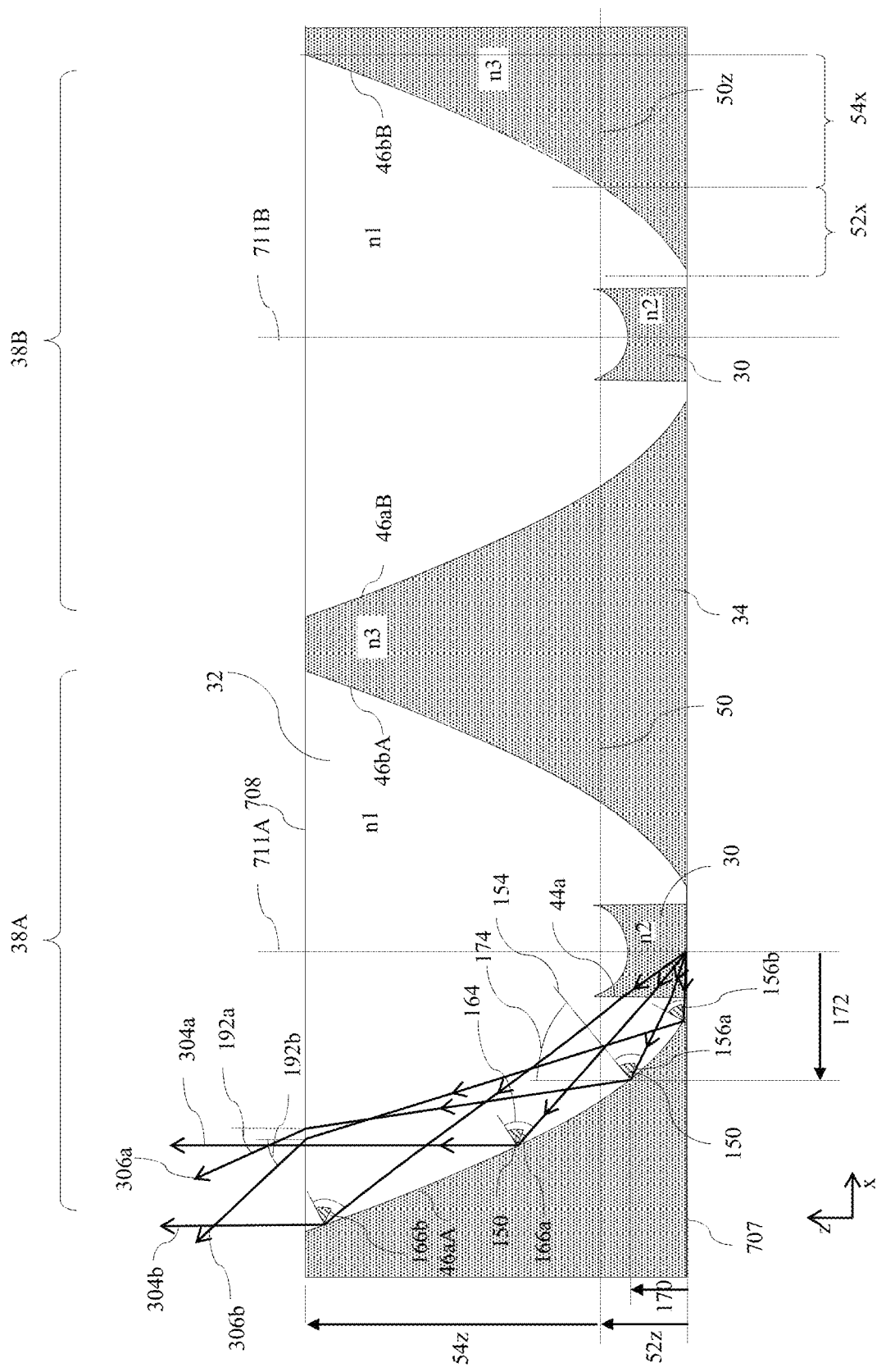
FIG. 2B is a schematic diagram illustrating in side view propagation of principal light rays from a light source at the optical axis of one of a pair of solid catadioptric optical element comprising a low index material between the cross-sectional outer interfaces.

FIG. 2B is a schematic diagram illustrating in side view propagation of principal light rays from a light source 3 at the optical axis 711 of one of a pair of solid catadioptric optical elements 38A, 38B comprising a low index material 34 between the cross-sectional outer interfaces. In comparison to the arrangement of FIG. 2A, the coating layer of low index material 34 on the outer interface 46 is replaced by a continuous region of low index material between the outer interfaces 46 of adjacent catadioptric optical elements 38. Advantageously manufacturing complexity may be reduced.

Figure 2C:
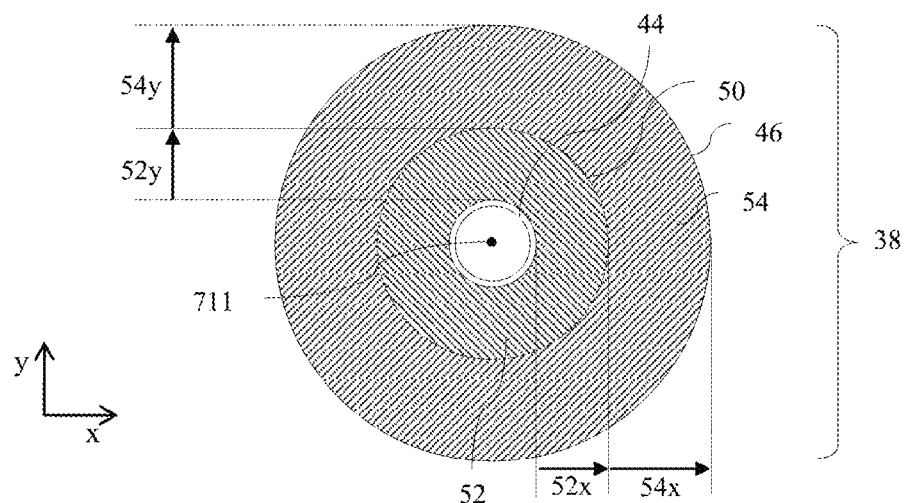
FIG. 2C is a schematic diagram illustrating in top view of a circular solid catadioptric optical element.

FIG. 2C is a schematic diagram illustrating in top view of a circular catadioptric optical element 38. First outer interface region 52 is arranged on the inner side of boundary 50 and second outer interface region 54 is arranged between the boundary 50 and the outer edge of the catadioptric optical element 38.

Figure 2D:
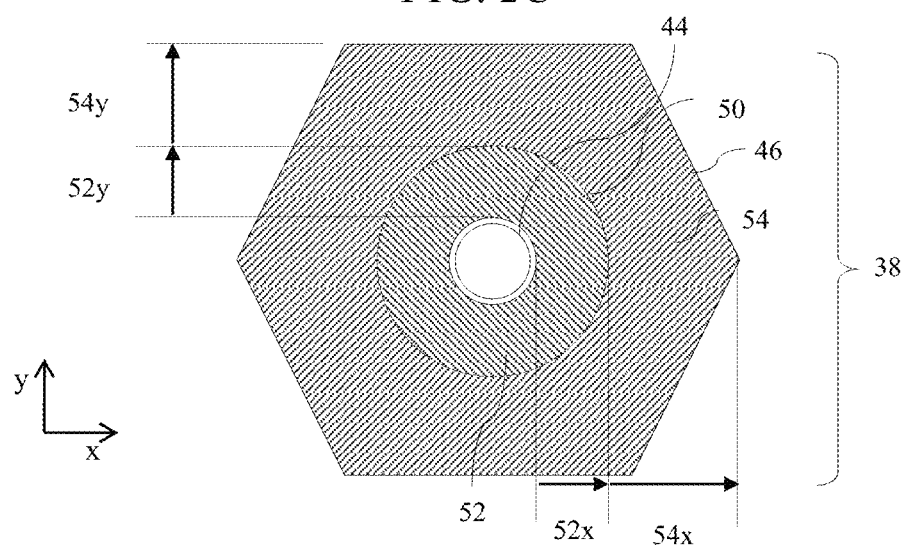
FIG. 2D is a schematic diagram illustrating in top view of a hexagonal solid catadioptric optical element.

FIG. 2D is a schematic diagram illustrating in top view of a hexagonal catadioptric optical element 38. Such elements may be used to increase uniformity of output of an array of catadioptric optical elements. The second outer interface region 54 is arranged between the boundary 50 and the outer edge of the catadioptric optical element 38.

Figure 2E:
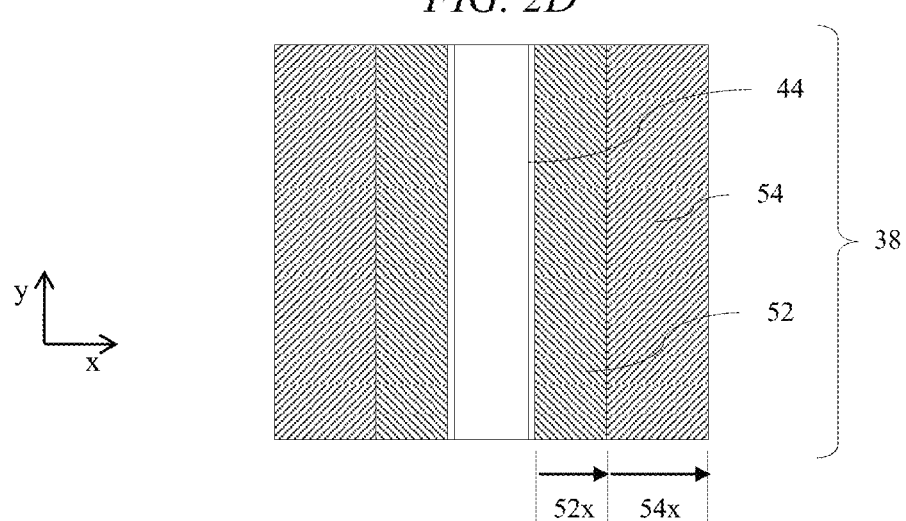
FIG. 2E is a schematic diagram illustrating in top view of a linear solid catadioptric optical element.

FIG. 2E is a schematic diagram illustrating in top view of a linear catadioptric optical element 38. In comparison to FIGS. 2C and 2D, an elongate optical output may be provided. Advantageously complexity of tooling is reduced and alignment tolerances are relaxed, reducing cost.

Illustrative embodiments will now be provided for the shape of the outer interface 46a, 46b in the outer interface regions 52, 54, as illustrated in TABLE 1, where combinations 1 and 2 are illustrative embodiments of the present disclosure.

TABLE 1

| | Illustrative embodiments for catadioptric materials | | | | |
|---|---|---|---|---|---|
| Combination | FIGS. | Material 32 Refractive index n1 | Material 30 Refractive index n2 | Material 34 Refractive index n2 | Critical angle/deg |
| 1 | 3A, 4A, 5A, 6A, 7A, 7E | 1.60 | 1.30 | 1.30 | 54.3 |
| 2 | 3B, 4B, 5B, 6B, 7B, 7F | 1.60 | 1.38 | 1.38 | 59.6 |
| 3 | 3C, 4C, 5C, 6C, 7C, 7G | 1.56 | 1.0 | 1.0 | 39.9 |

Shapes of the outer interface 46 of catadioptric optical elements 38 will now be described.

Figure 3A:
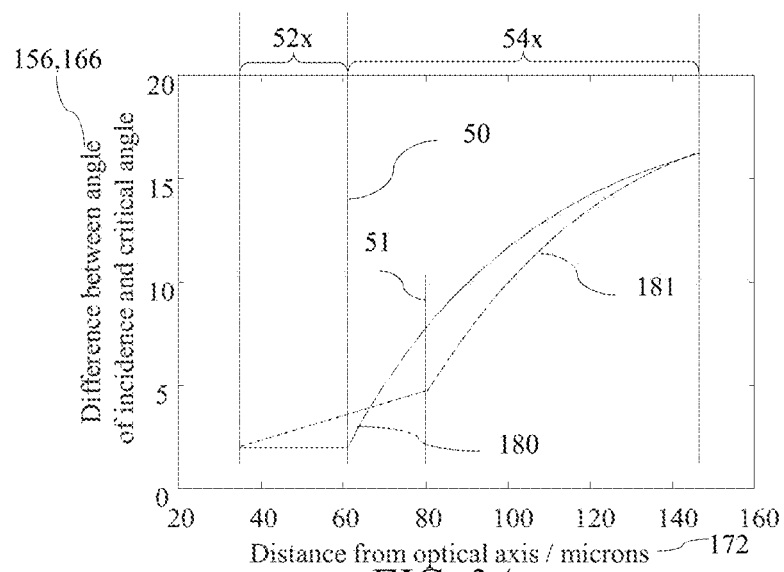
FIGS. 3A-C are schematic graphs illustrating the profile of the difference between the angle of incidence at the cross-sectional outer interfaces and the critical angle of principal rays against distance from the optical axis for first, second and third combinations of refractive indices respectively.
Figure 3B:
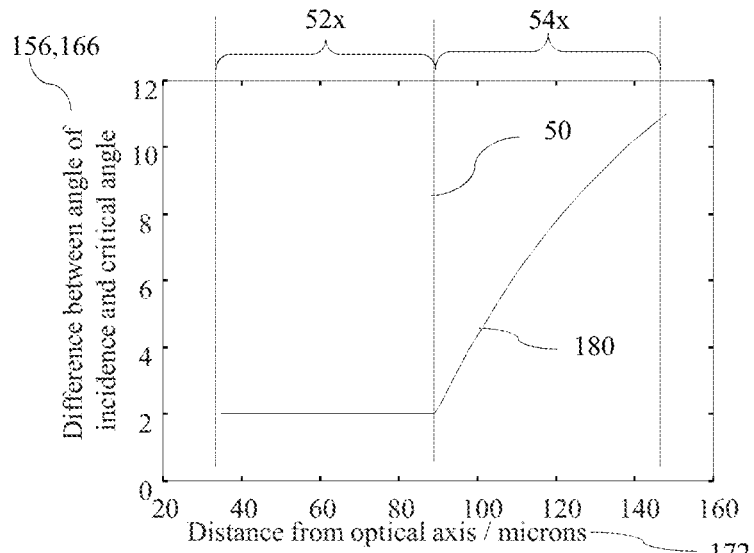

FIGS. 3A-3B are schematic graphs illustrating the profile 180 of the difference 156a, 156b, 166a, 166b between the angle of incidence 164 at the first and second cross-sectional outer interfaces 46a, 46b and critical angle of principal rays 306a, 306b, 304a, 304b against distance 172 in the lateral direction (x-axis) from the optical axis 711 of a catadioptric optical element 38 for first, second and third combinations of refractive indices respectively.

Features of the arrangements of FIGS. 3A-B not discussed in further detail may be assumed to correspond to the features with equivalent reference numerals as discussed above, including any potential variations in the features.

FIGS. 3A and 3B illustrate that the (mathematical) derivative of the profile 180 of the difference 156, 166 between the angle of incidence 164 of each principal light ray 306a, 306b and the critical angle at the first and second outer interfaces 46a, 46b with respect to lateral location (i.e. location in the x or y plane) has a discontinuity at the boundary 50 between the first and second outer interface regions 52, 54.

Considering again the rays in FIG. 2A, in the embodiments of FIGS. 3A and 3B the difference 156a, 156b between the angle of incidence 164 of each principal light ray 306a, 306b and the critical angle is a constant across the first outer interface region 52 and the difference, 166a, 166b between the angle of incidence 164 of each principal light ray 304a, 304b and the critical angle monotonically increases across the second outer interface region 54. Thus, in operation principal light rays 306a, 306b are incident on the cross-sectional outer interface 46a in the first outer interface region 42 such that the difference between the angle of incidence is substantially the same. In the illustrative example, the difference in the angle of incidence to the critical angle is +2 degrees, that is greater than the critical angle. The difference may be set to provide a tolerance for tooling and replication errors of the catadioptric optical element, as well as providing total internal reflection for rays from the edge of the LED 3 as well as for the principal rays that are typically from the centre of the LED 3.

Thus using known and low cost materials for a solid catadioptric element 38, light rays 304*a* are reflected by total internal reflection at the outer interface 46*a* and directed towards the output end 708 with angle 192*a* that is not parallel to the optical axis 711, but provides a fan of output directions 192*a*, 192*b* that depend on the initial direction of the respective principal ray from the LED 3.

At the location of the boundary 50 between the outer interface regions 52, 54, the rays are directed parallel to the optical axis 711 when the difference between the angle of incidence 164 and the critical angle is 2 degrees. At positions in the above the interface 50, the tilt angle 174 of the surface normal is adjusted to achieve alignment of output principal rays 304*a*, 304*b* that are parallel to the optical axis 711.

Advantageously most of the principal rays are directed in a direction that is parallel to the optical axis by total internal reflection, providing high levels of collimation for light rays reflected from the outer surfaces 46*a*, 46*b*. Light rays that are incident on the region 52 are directed in directions that are close to but not identical to the collimation direction for known low cost materials in a solid catadioptric optical element 38.

Further shapes for the outer interface 46 will now be described.

Figure 4A:
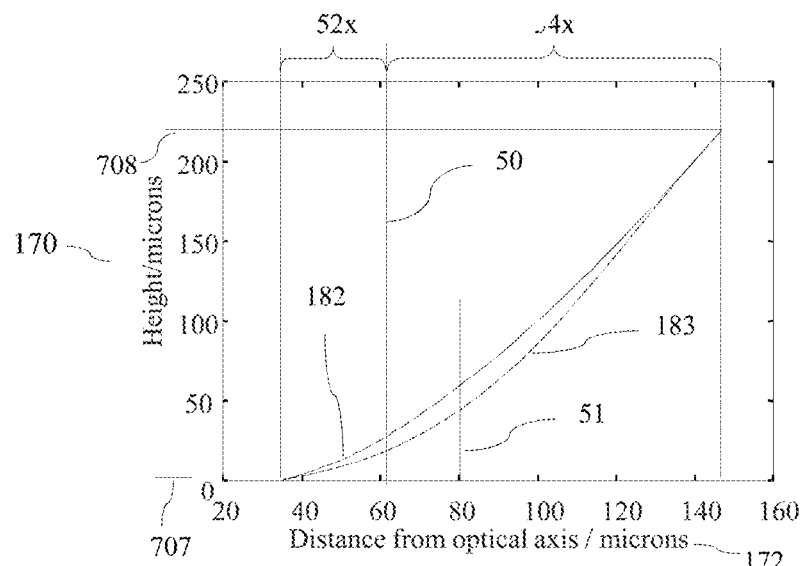
FIGS. 4A-C are schematic graphs illustrating the profile of locations of a cross-sectional outer interface of a catadioptric optical element against distance from the optical axis for first, second and third combinations of refractive indices respectively.
Figure 5A:
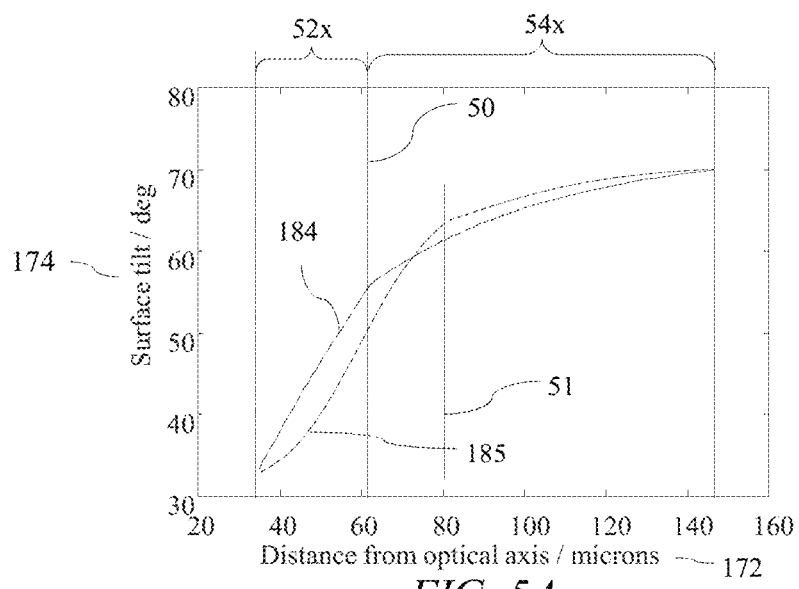
FIGS. 5A-C are schematic graphs illustrating the profile of cross-sectional outer interface tilt angle of a catadioptric optical element against distance from the optical axis for first, second and third combinations of refractive indices respectively.

FIG. 3A further illustrates an alternative shape for the outer interface comprising profile 181 of difference 156 in a first outer interface region 52 and of difference 161 in a second outer interface region 54, with boundary 51 between the two regions. FIG. 4A illustrates profile 183 that describes the shape of the outer interface 46, and FIG. 5A illustrates profile 185 that describes the variation of tilt angle 174 with position 172.

In comparison to the profile 180, the profile 181 in the first outer interface region 52 is not constant but increases with distance from the optical axis 711. The embodiment of profile 180 provides total internal reflection for principal light rays from the centre of the LED 3, however some light rays from one edge of the LED 3 may be incident on the surface at angles less than the critical angle. Such light rays are partially transmitted through the cross-sectional outer interface 46 and contribute to stray light and degraded privacy performance.

Advantageously, the profile 181 in the first cross-sectional outer interface region 52 can provide improved illumination output directionality for finite size LEDs 3.

Further profiles 181, 183, 185 are illustrated as having a different profile in the second cross-sectional outer interface region 54 for locations outside the boundary 51. Reduced collimation may be provided in comparison to the arrangement of profile 180. Advantageously a smoother roll-off in display luminance with viewing angle may be provided, increasing display uniformity in a privacy display application as will be described below.

The shape of the outer reflective surface will now be described.

Figure 4B:
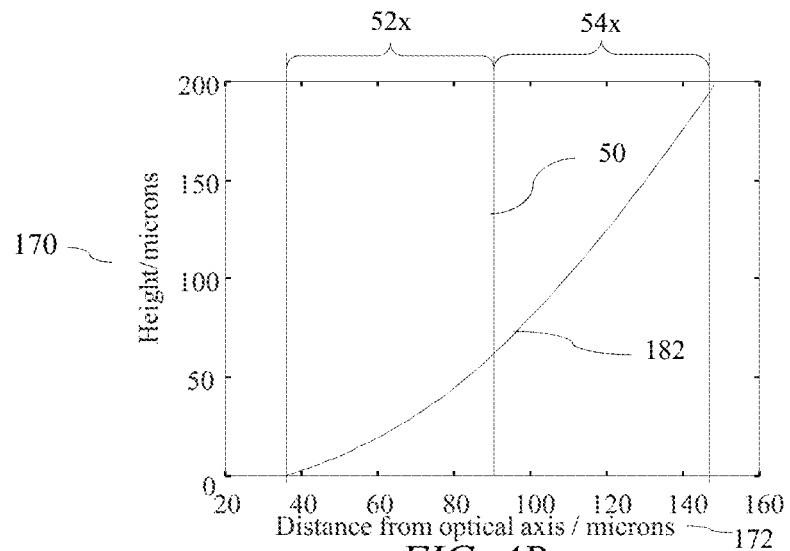

FIGS. 4A-4B are schematic graphs illustrating the profile 182 of height of a cross-sectional outer interface 46 of a catadioptric optical element 38 against distance 172 from the optical axis 711 for first, second and third combinations of refractive indices respectively. FIGS. 4A and 4B illustrate that the height 170 from the first end 707 of the first and second outer interfaces 46*a*, 46*b* increases monotonically between the first and second end 707, 708 of the catadioptric optical element 38. In other words, the shape of the surface may increase monotonically without kinks or discontinui-ties. Features of the arrangements of FIGS. 4A-B not discussed in further detail may be assumed to correspond to the features with equivalent reference numerals as discussed above, including any potential variations in the features.

The profile of surface tilt 174 of the surface profiles of FIGS. 4A-4B will now be described.

Figure 5B:
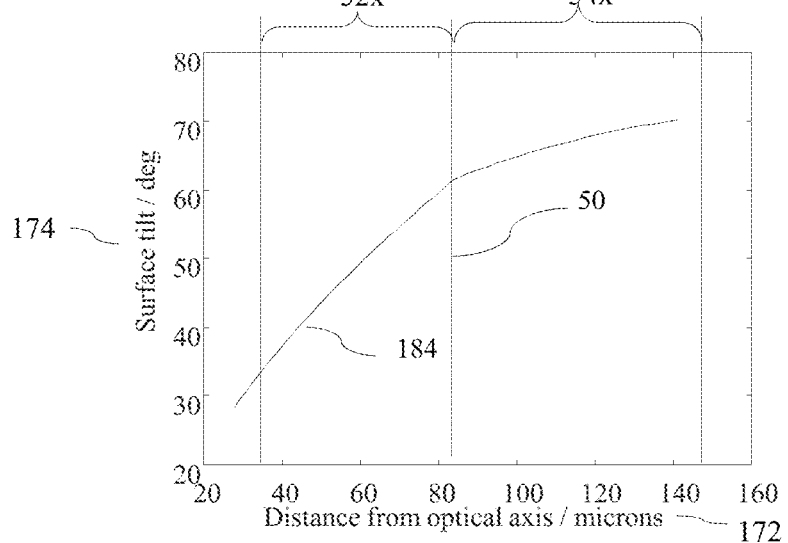

FIGS. 5A-5B are schematic graphs illustrating the profile 184 of cross-sectional outer interface tilt 174 of a catadioptric optical element 38 against distance 172 from the optical axis 711 for first, second and third combinations of refractive indices respectively. FIGS. 5A and 5B illustrate that the tilt angle 174 with respect to the optical axis 711 of the interface normal 154 of each of the first and second cross-sectional outer interfaces 46*a*, 46*b* increases monotonically between the first and second end 707, 708 of each catadioptric optical element 38.

At boundary 50, the rate of change of tilt changes due to the discontinuity illustrates in FIGS. 3A-3B. Thus, the derivative of the surface tilt angle 174 with respect to distance 172 from optical axis 711 has a discontinuity at the boundary 50 between the respective first and second outer interface regions 52, 54 of the first and second cross-sectional outer interfaces 46*a*, 46*b*.

A smooth surface illustrated in FIGS. 4A-4B may be achieved. Advantageously such surfaces may be provided with high accuracy by known tooling and replication methods. Further such a surface may provide low levels of stray light in comparison to discontinuous surface height profiles.

Features of the arrangements of FIGS. 5A-B not discussed in further detail may be assumed to correspond to the features with equivalent reference numerals as discussed above, including any potential variations in the features.

The respective profiles of a collimating catadioptric element 38 for operation in air will now be described for purposes of comparison with the present embodiments.

Figure 3C:
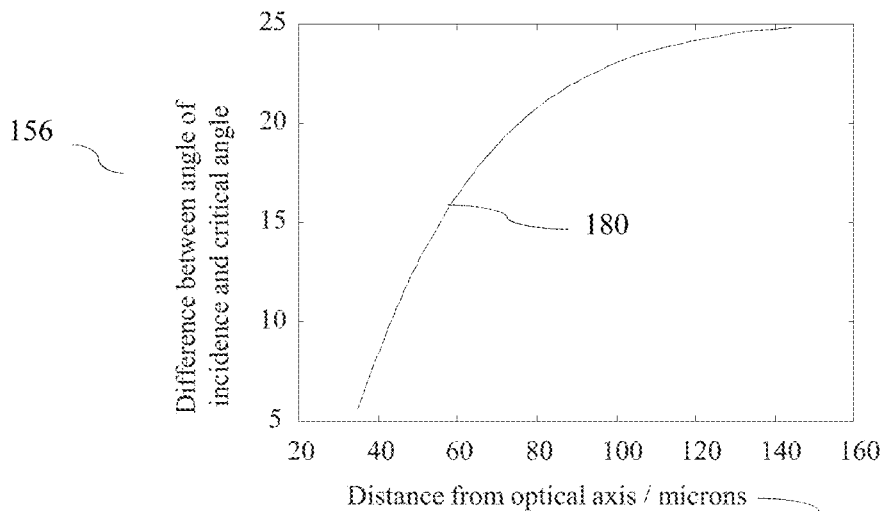
Figure 4C:
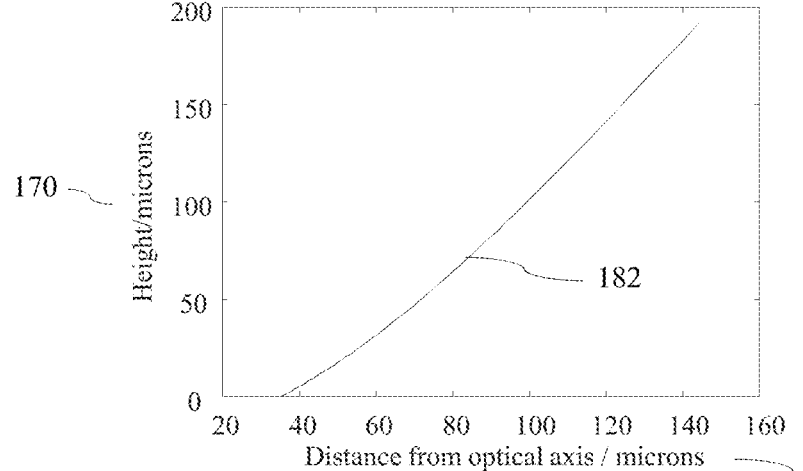
Figure 5C:
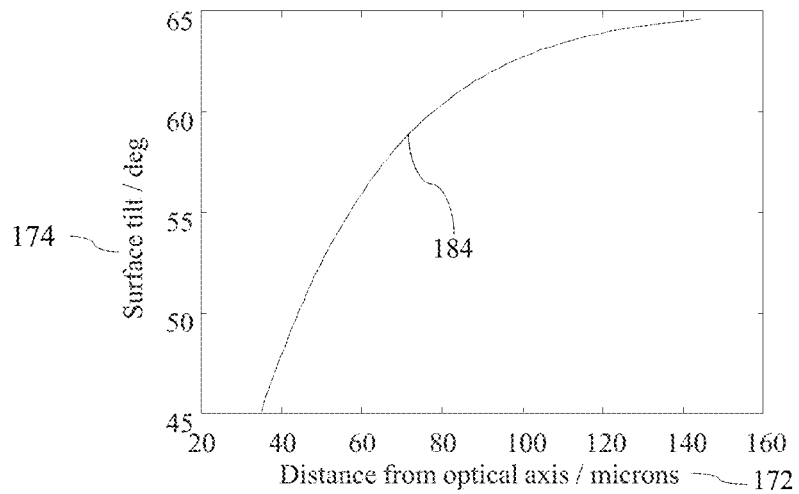

FIGS. 3C, 4C and 5C illustrate the structure of catadioptric optical elements 38 in air by way of comparison with the present solid catadioptric optical elements 38, that is air is arranged between the outer interfaces of adjacent catadioptric optical elements 38*a*, 38*b*.

As illustrated in TABLE 1, the critical angle in the catadioptric optical element 38 in air is less than 45 degrees so that light rays that are parallel to the LED substrate in the x-direction may be directed by an inclined surface at 45 degrees by internal reflection in a direction parallel to the optical axis 711. Thus, no boundary 50 between first and second outer interface regions is provided in order to achieve collimated light. Features of the arrangements of FIGS. 3C, 4C and 5C not discussed in further detail may be assumed to correspond to the features with equivalent reference numerals as discussed above, including any potential variations in the features.

The simulated angular distribution 120 of luminance from catadioptric optical elements 38 with the properties described in TABLE 1 and illustrated in FIGS. 3A-3C, 4A-C and 5A-C will now be illustrated.

Figure 6A:
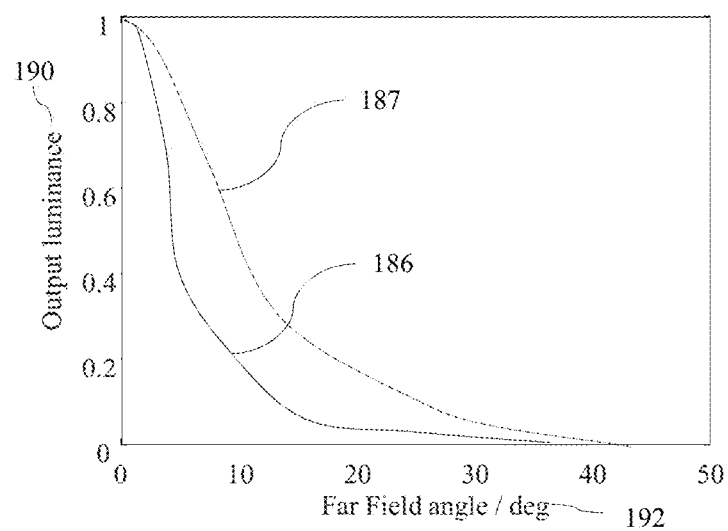
FIGS. 6A-C are schematic graphs illustrating the profile of output luminance with illumination output angle for first, second and third combinations of refractive indices respectively.
Figure 6B:
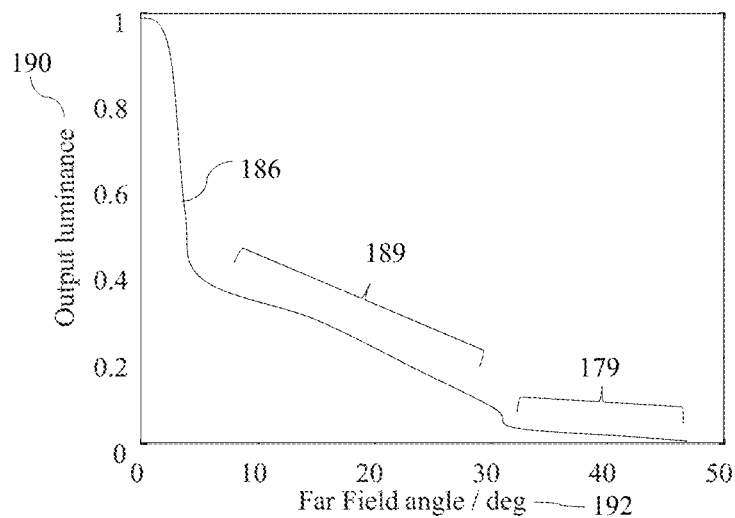
Figure 6C:
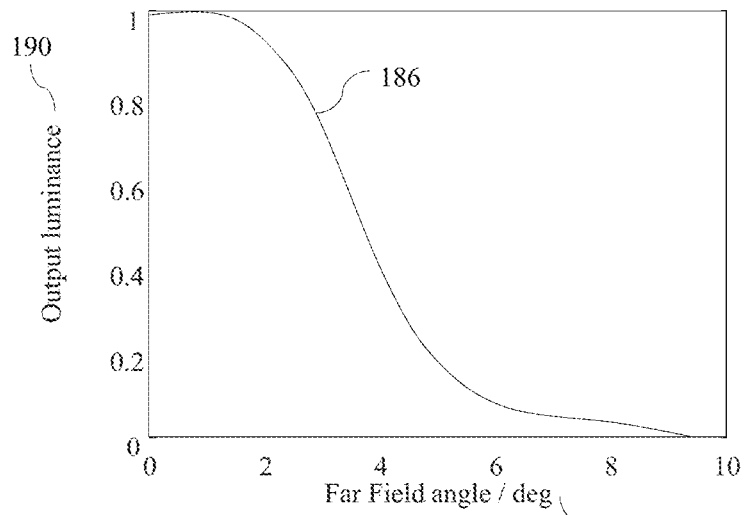

FIGS. 6A-6C are schematic graphs illustrating the profile 186 of output luminance 190 with viewing angle 192 for first, second and third combinations of refractive indices respectively.

As illustrated in FIG. 6C, a narrow luminance distribution of maximum angular output direction of less than 10 degrees may be provided.

FIG. 6A illustrates schematically profile 186 of output luminance 190 with viewing angle 192 for the profiles 180, 182, 184 of FIGS. 3A, 4A and 5A also illustrates schematically profile 187 of output luminance 190 with viewing angle 192 for the profiles 181, 183, 185. Thus the profile 187 has a broader angular profile close to the optical axis 711. Advantageously display luminance roll-off with viewing angle and display uniformity may be improved in a privacy mode of operation. The profile 187 may further have reduced stray light losses, and thus reduced image cross talk for large sized LEDs 3.

By way of comparison the present embodiments have low levels of luminance above 30 degrees for the first combination of refractive indices and low levels of luminance above 40 degrees for the second combination of refractive indices. Such illumination is not as collimated as for elements in air, however as will be described below provide suitable illumination levels for directional display operation while achieving benefits of solid catadioptric optical elements.

FIG. 6B further illustrates region 189 that is illuminated by light rays that are directed by the refractive inner interface 42. As the difference in first and second refractive indices are reduced in comparison to FIG. 6A then the relative amount of light in region 189 increases. In region 179, illumination is provided by light rays from the outer interface 46 in the first outer interface region 52.

The operation of the present embodiments in a privacy display will now be further described.

Figure 6D:
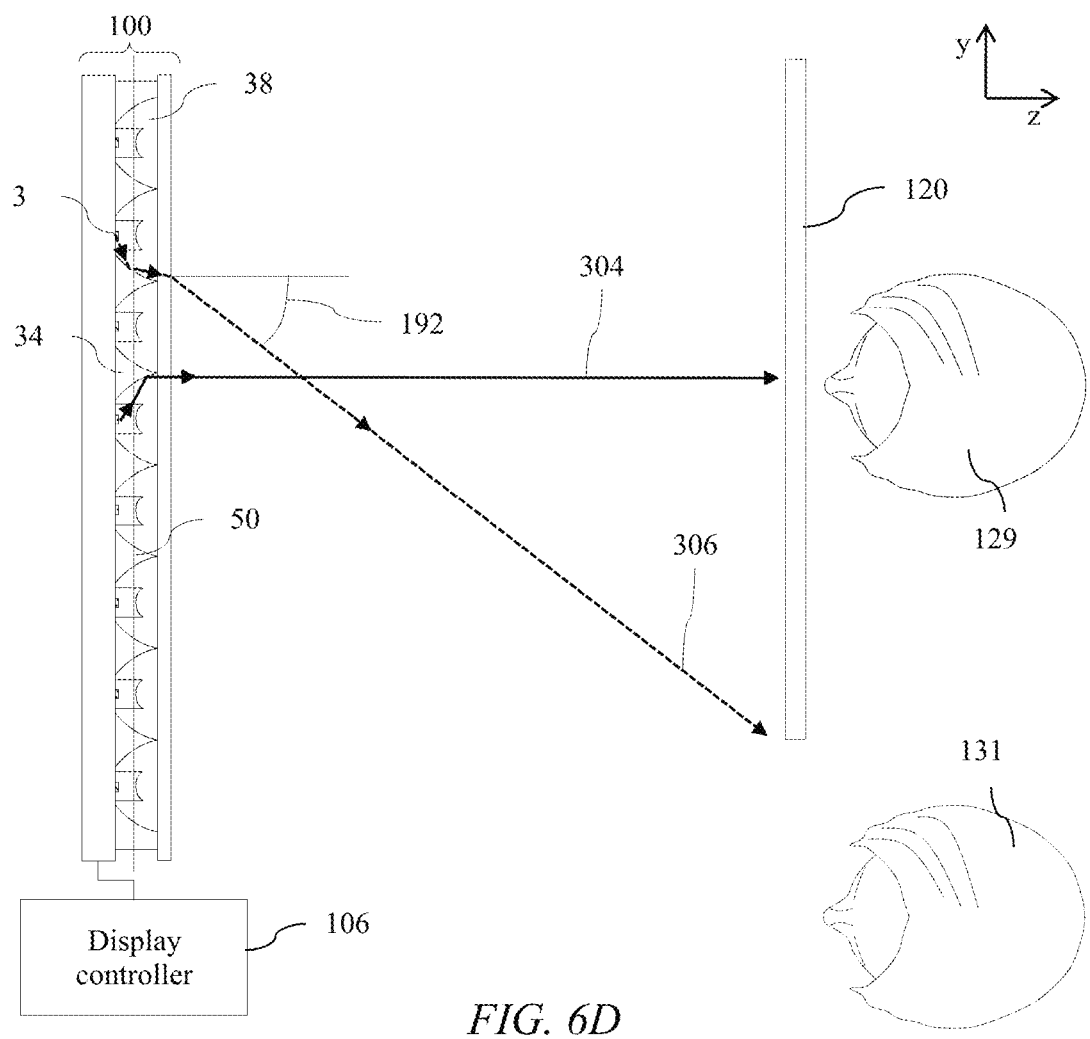
FIG. 6D is a schematic diagram illustrating in top view operation of a privacy display comprising solid catadioptric optical elements comprising first and second cross-sectional outer interface regions.

FIG. 6D is a schematic diagram illustrating in top view operation of a privacy display comprising solid catadioptric optical elements comprising first and second cross-sectional outer interface regions. Ray 304 that is incident on the second interface region 54 between the boundary 50 and the second end 708 of the catadioptric optical elements 38 is directed in an on-axis direction towards the observer 129 located in a head-on in directional distribution 120. By way of comparison light rays 306 are directed in of-axis directions towards the edge of the directional distribution 120. Snooper 131 is located outside the directional distribution provided by the display 100 and thus is not able to perceive an image on the display 100 with high luminance levels.

Returning to FIG. 6B the privacy performance of the display may be dominated by the amount of light in region 179. Advantageously, the present embodiments achieve reduced luminance in region 179 in a solid catadioptric optical element. Features of the arrangements of FIG. 6D not discussed in further detail may be assumed to correspond to the features with equivalent reference numerals as discussed above, including any potential variations in the features.

Advantageously a solid catadioptric optical element 38 may be arranged to provide privacy display operation with low image visibility for an off-axis snooper.

The operation of the cross-sectional outer interfaces 46a, 46b will now be described further using forwards raytracing.

Figure 7A:
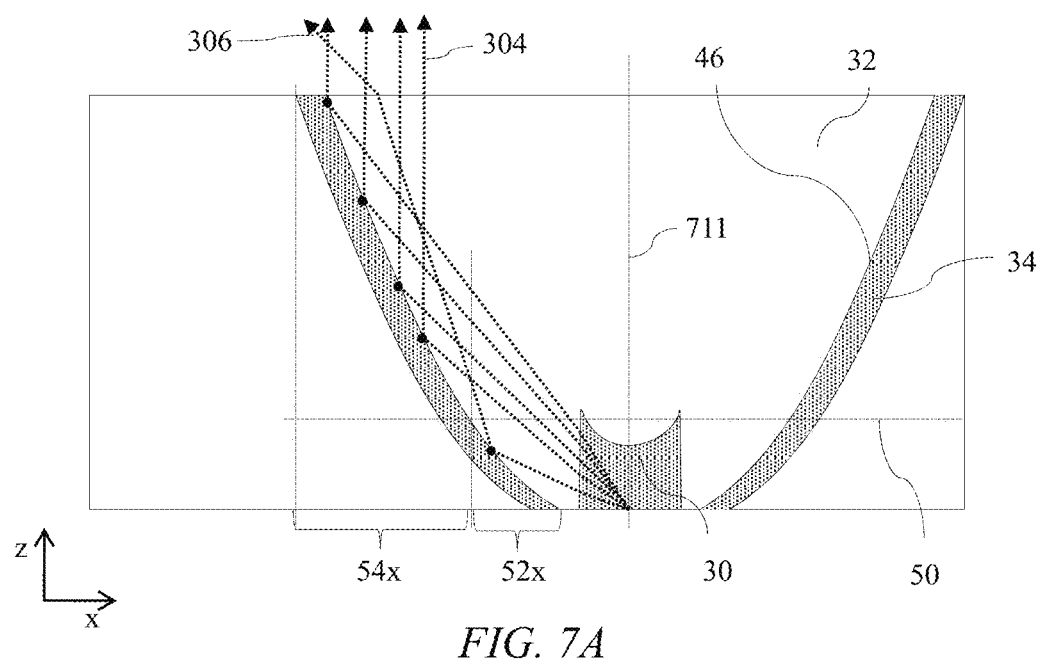
FIG. 7A is a are schematic diagram illustrating in side view propagation of principal light rays in a solid catadioptric optical element that is provided with interfaces of the types illustrated in FIGS. 3A, 4A and 5A with two cross-sectional outer interface regions.

FIG. 7A is a schematic diagram illustrating in top view propagation of principal light rays in a solid catadioptric optical element that is provided with interfaces of the types illustrated in FIGS. 3A, 4A and 5A with two cross-sectional outer interface regions 52, 54. Example output principal rays 304, 306 are illustrated for the profiles 180, 182, 184. Light rays 304 are directed parallel to the optical axis 711 by outer interface region 54 while rays 306 from outer interface region 52 is directed towards an off-axis direction. Features of the arrangements of FIG. 7A not discussed in further detail may be assumed to correspond to the features with equivalent reference numerals as discussed above, including any potential variations in the features.

Collimation of light is provided by at least some parts of the outer interface 46, and other parts provide light rays at small angles to the optical axis 711. Advantageously luminance at angles close to snooper 131 locations are minimised.

Figure 7B:
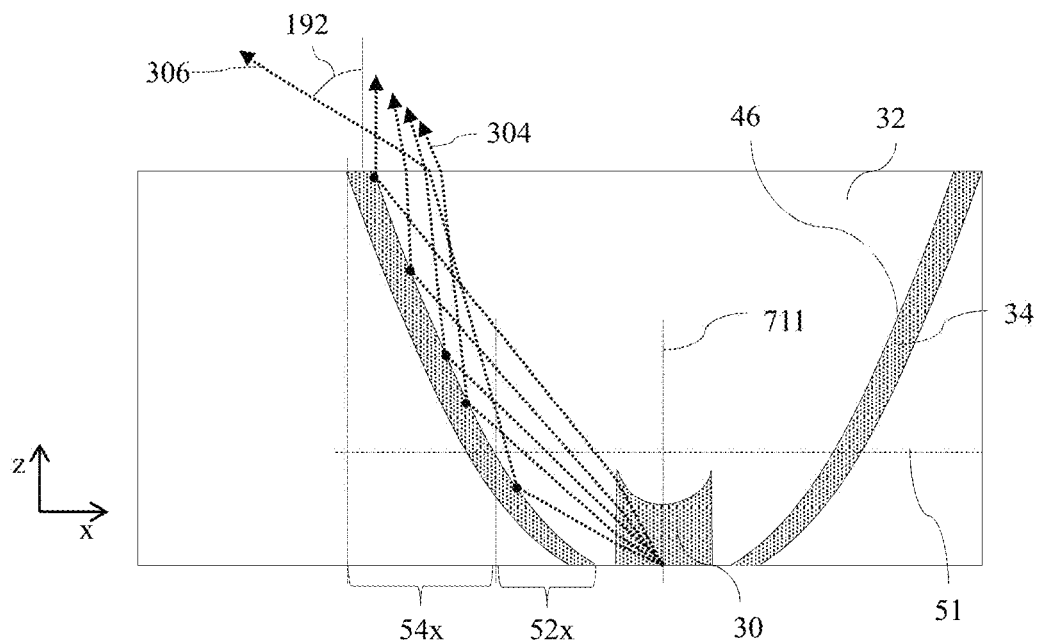
FIG. 7B is a are schematic diagram illustrating in side view propagation of principal light rays in a solid catadioptric optical element that is provided with interfaces of the types illustrated in FIGS. 3B, 4B and 5B with two cross-sectional outer interface regions.

FIG. 7B is a schematic diagram illustrating in top view propagation of principal light rays in a solid catadioptric optical element that is provided with interfaces of the types illustrated in FIGS. 3B, 4B and 5B with two cross-sectional outer interface regions 52, 54 and material indices as shown in TABLE 1. Features of the arrangements of FIG. 7B not discussed in further detail may be assumed to correspond to the features with equivalent reference numerals as discussed above, including any potential variations in the features.

Output principal rays 304, 306 for the profiles 181, 183, 185. In the first cross-sectional outer interface region 52, principal light rays 306 are directed at a higher far field angle 192 than in FIG. 7A. As illustrated in FIG. 6B, a wider field of view is provided than for FIGS. 6A and 7A, however a lower cost material system may advantageously be provided while maintaining a degree of privacy performance. To compensate for the increase in field angle the size of LEDs 3 may be reduced to achieve similar cone angles of output distribution 120. Advantageously desirable privacy performance may be provided.

By way of comparison with the present embodiments, the operation of outer interfaces designed for use in catadioptric optical elements operating in air will now be described.

Figure 7C:
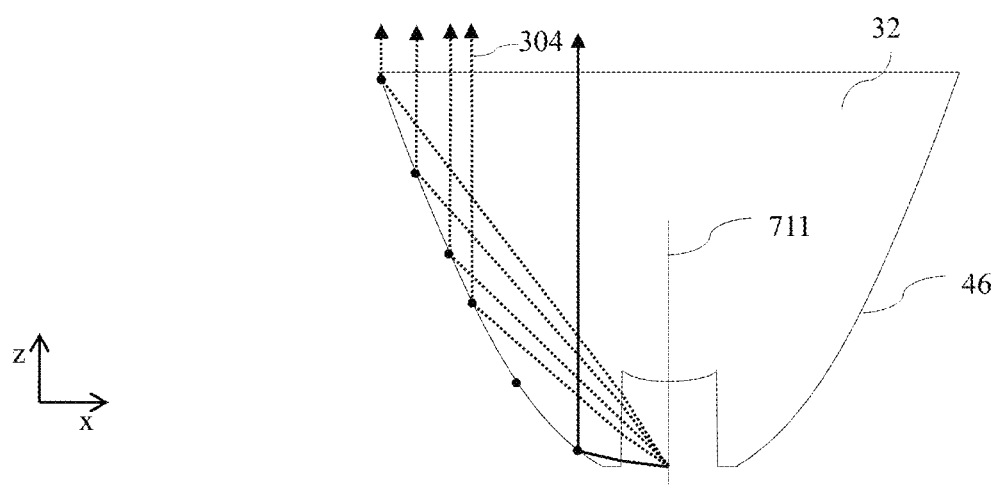
FIG. 7C is a schematic diagram illustrating in side view propagation of principal light rays in a catadioptric optical element in air that is provided with interfaces of the shape illustrated in FIGS. 3C, 4C and 5C for use in air and without two outer interface regions.

FIG. 7C is a schematic diagram illustrating in side view propagation of principal light rays in a catadioptric optical element in air that is provided with interfaces of the shape illustrated in FIGS. 3C, 4C and 5C for use in air and without two outer interface regions. All output rays 304 may be provided parallel to optical axis 711 arising from the high index step between the material 32 and air. As illustrated in FIG. 6C, such a design can achieve a narrow distribution 120, with size determined by LED 3 size.

By way of comparison with the present embodiments, the operation of the outer interface 46 of FIGS. 3C,4C,5C and 7C when used in a solid catadioptric optical element will now be described.

Figure 7D:
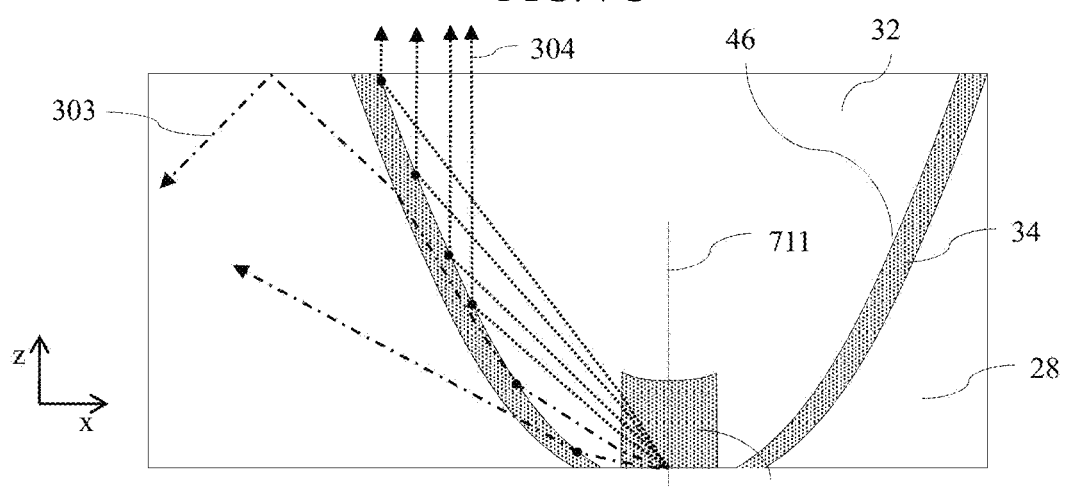
FIG. 7D is a schematic diagram illustrating in side view propagation of principal light rays in a solid catadioptric optical element that is provided with interfaces of the shape illustrated in FIGS. 3C, 4C and 5C for use in air and without two outer interface regions.

FIG. 7D is a schematic diagram illustrating in top view propagation of principal light rays in a solid catadioptric optical element that is provided with interfaces of the shape illustrated in FIGS. 3C, 4C and 5C (that are designed for use in air) and without two outer interface regions. By way of comparison with present embodiments, stray light rays 303 may be transmitted through the cross-sectional outer interfaces 46. Such stray light may undesirably provide image cross talk and high angle illumination. The profile of FIGS. 3C, 4C and 5C thus achieve undesirable illumination output.

The operation of the cross-sectional outer interfaces 46a, 46b will now be described further using reverse raytracing, that is raytracing from a source at infinity towards the LED 3 location.

Figure 7E:
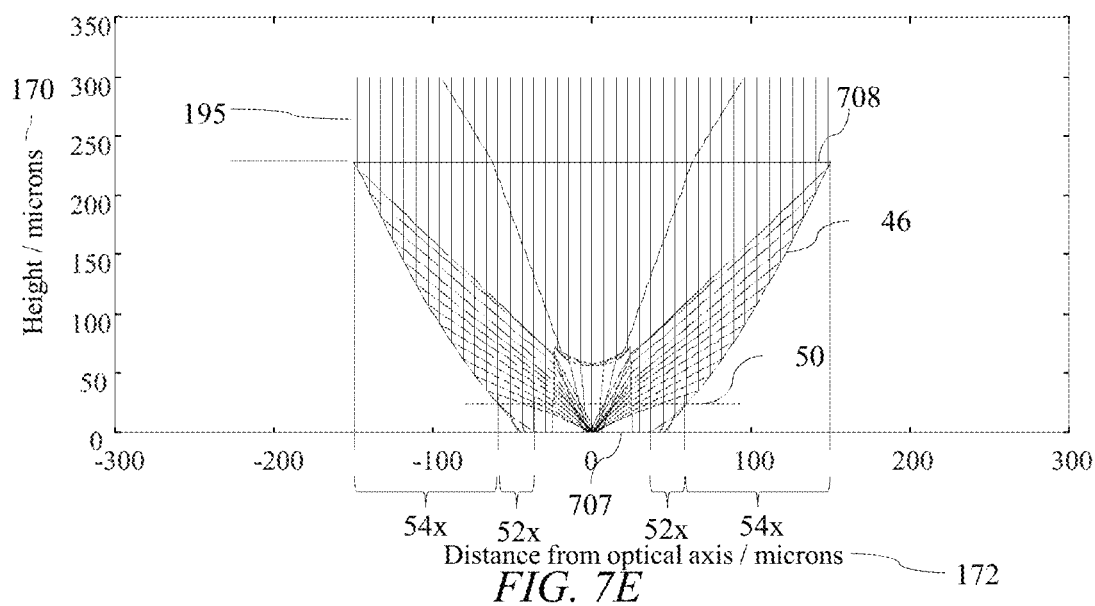
FIG. 7E is a schematic diagram illustrating in side view propagation of on axis light rays towards the source in a solid catadioptric optical element with interfaces of the types illustrated in FIGS. 3A, 4A and 5A with two cross-sectional outer interface regions.
Figure 7F:
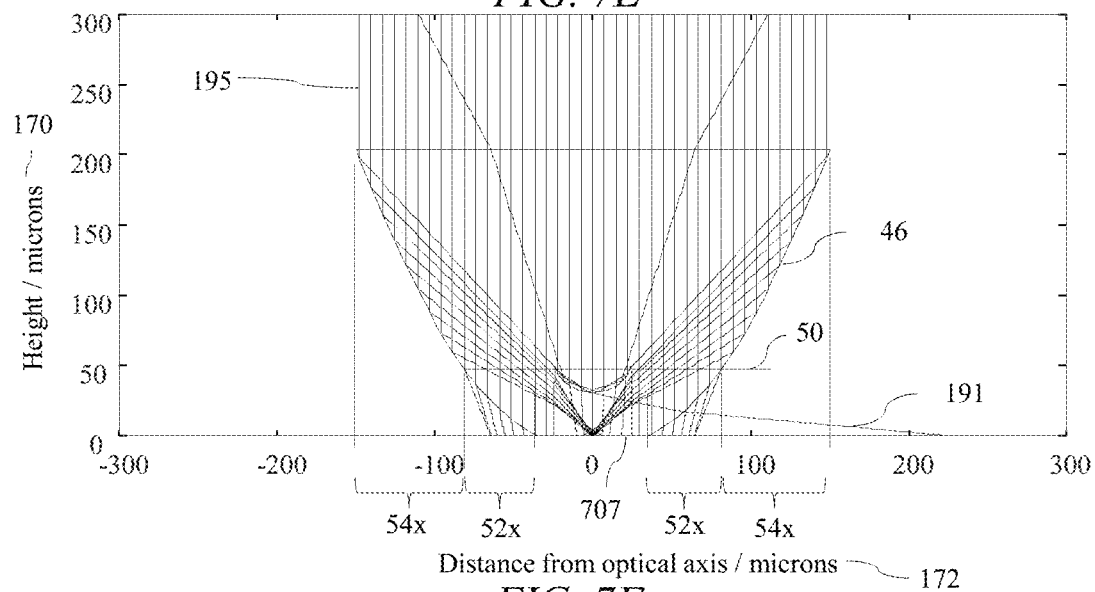
FIG. 7F is a schematic diagram illustrating in side view propagation of on axis light rays towards the source in a solid catadioptric optical element with interfaces of the types illustrated in FIGS. 3B, 4B and 5B with two cross-sectional outer interface regions.

FIG. 7E is a schematic diagram illustrating in side view propagation of on axis light rays towards the source in a solid catadioptric optical element 38 with interfaces of the types illustrated in FIGS. 3A, 4A and 5A with two cross-sectional outer interface regions 52, 54; and FIG. 7F is a schematic diagram illustrating in side view propagation of on axis light rays towards the source in a solid catadioptric optical element 38 with interfaces of the types illustrated in FIGS. 3B, 4B and 5B with two cross-sectional outer interface regions 52, 54.

Figure 7G:
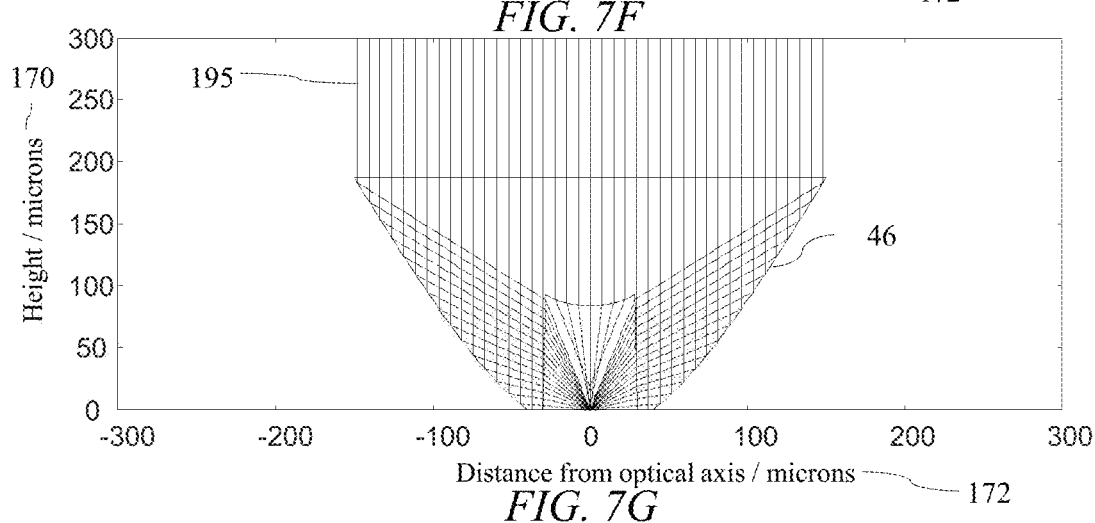
FIG. 7G is a schematic diagram illustrating in side view propagation of on axis light rays towards the source in a catadioptric optical element of the type illustrated in FIGS. 3C, 4C and 5C operating in air and without two outer interface regions.

By way of comparison with the present embodiments, FIG. 7G is a schematic diagram illustrating propagation of on axis light rays towards the source in a catadioptric optical element operating in air and without two outer interface regions 52, 54. Features of the arrangements of FIGS. 7E-G not discussed in further detail may be assumed to correspond to the features with equivalent reference numerals as discussed above, including any potential variations in the features.

The operation of the interfaces can be further represented by examining the paths of rays 195 for an on-axis light source (not shown) that is directed through the second end 708 of the catadioptric optical element 38. Such reverse raytraces are for illustrative purpose and do not fully describe the propagation of light from the LED 3, for example stray light rays 191 are not present in light directed by the LED 3.

FIG. 7G illustrates that an element in air is capable of collimating light for all principal rays, and first and second cross-sectional outer interface regions are not provided to achieve a suitable illumination for privacy display operation.

By way of comparison in the embodiments of FIGS. 7E-F, light rays that are in the second outer interface regions 54 are reflected by total internal reflection towards the LED 3. However, light rays incident on the first outer interface region 52 have angles of incidence that are less than the critical angle and are transmitted through the outer interfaces, thus not reaching the location of the LED 3. Light rays from regions 52 are not directed in a collimated direction substantially parallel to the optical axis by total internal reflection, but are directed in off-axis directions as described above.

Such transmitted light rays illustrate that the solid catadioptric optical elements 38 do not provide on-axis collimation for principal rays.

The advantages of the solid catadioptric optical elements 38 with cross-sectional outer regions 52, 54 will now be further described.

As illustrated in FIGS. 6A and 6B, far field luminance profiles may provide illumination structures from solid catadioptric optical elements 38 and respective aligned LEDs 3 such that privacy display users 129 may be provided with high levels of image luminance while off-axis snoopers 131 at typical angles greater than 45 degrees may have minimal image visibility.

As illustrated in FIGS. 1D-1G, solid catadioptric optical elements 38 can be used to provide barrier layers to prevent water vapour 202 and oxygen 200 ingress and advantageously improve the performance of LEDs, particularly organic LEDs. By way of comparison, non-solid catadioptric optical elements could be provided with oxygen-free gas or a vacuum in the region between the respective cross-sectional outer interfaces; however preserving the oxygen-free gas or vacuum during the lifetime of the device may be expensive and impractical.

Thus cross-sectional outer surface 46 shapes may be provided for solid catadioptric optical elements 38 that prevent ingress of moisture or oxygen to the LEDs of the array while achieving privacy display.

The effect of atmospheric pressure changes and thermal variations for non-solid catadioptric optical elements will now be described.

Figure 8:
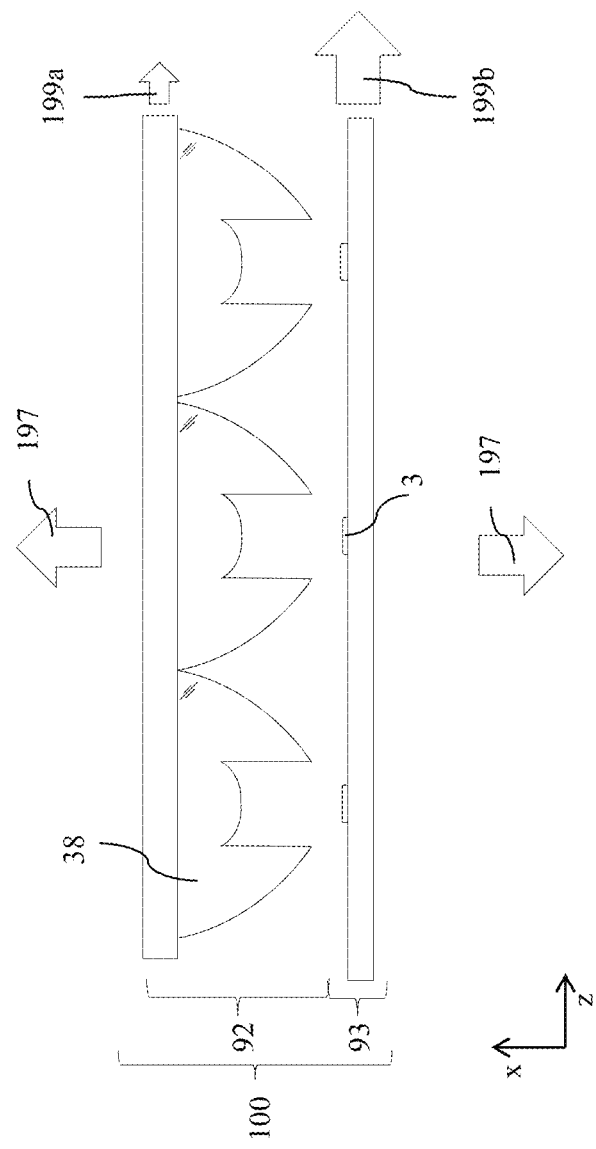
FIG. 8 is a schematic diagram illustrating in side view effect of reduced atmospheric pressure on alignment of a non-solid catadioptric optical element array.

FIG. 8 is a schematic diagram illustrating in side view effect of reduced atmospheric pressure on alignment of a non-solid catadioptric optical element array. In environments with reduced atmospheric pressure, gas pressure within the illumination apparatus may provide forces 197 from pressure differentials that separate the optical components, particularly if the substrates are flexible. In other words the gas present within the illumination apparatus is subject to expansion forces 197 when atmospheric pressure is reduced, for example when at altitude. Similarly the gas may be compressed, distorting the display the when the display is placed under high pressure for example when placed or operated under water. The illumination apparatus 100 comprising solid catadioptric optical elements 38 bonded to the LED backplane of the present disclosure advantageously minimise misalignment from atmospheric pressure changes. Further such apparatus advantageously enables flexible substrates to be used for curved and bendable displays.

Thermal variations for example due to heating from LEDs on the backplane 93 and material selection for the respective substrates 92, 93 may create differential expansion forces 199a, 199b between the backplane 92 and optical substrate 92, causing misalignment between the two substrates and degrading the quality of the optical output. The bonded solid catadioptric optical elements 38 of the present embodiments advantageously minimise non-uniformities due to thermal effects.

Applied pressure to the display, for example from user pressing the display, for example a touch screen function, may also undesirably move optical elements in air spaced optical components. Advantageously the present embodiments have reduced sensitivity to applied pressure.

Features of the arrangements of FIG. 8 not discussed in further detail may be assumed to correspond to the features with equivalent reference numerals as discussed above, including any potential variations in the features.

By way of comparison with the present embodiments, a solid catadioptric optical element in which the difference between the angle of incidence and the critical angle is constant across the cross-sectional outer surface will be described.

Figure 9A:
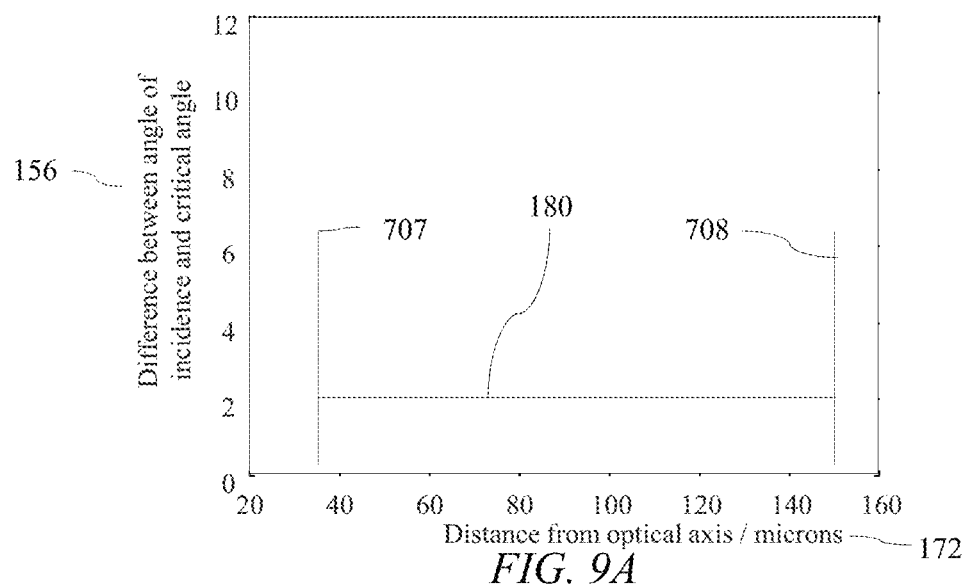
FIG. 9A is a schematic graph illustrating the profile of the difference between the angle of incidence and critical angle of principal rays against distance from the optical axis for a first combination of refractive indices respectively for a fixed difference.
Figure 9B:
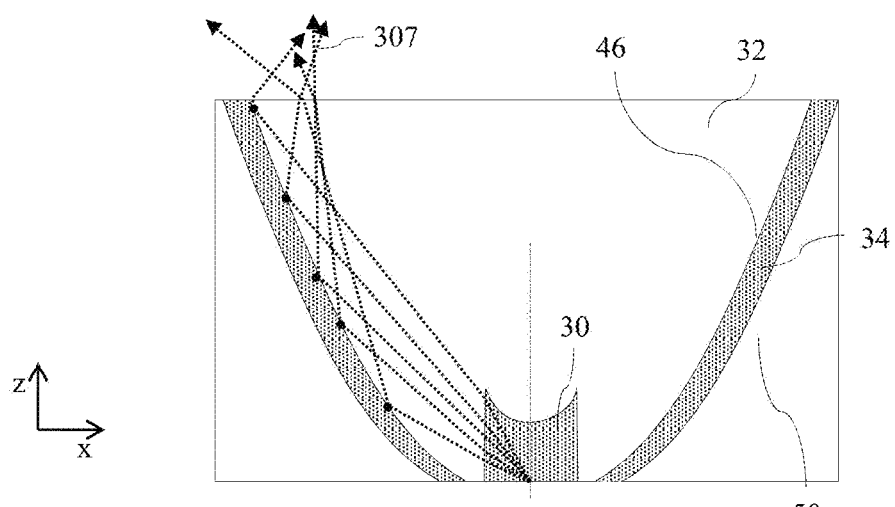
FIG. 9B is a schematic diagram illustrating in top view propagation of principal light rays in a solid catadioptric optical element that is provided with interface profile illustrated in FIG. 9A.
Figure 9C:
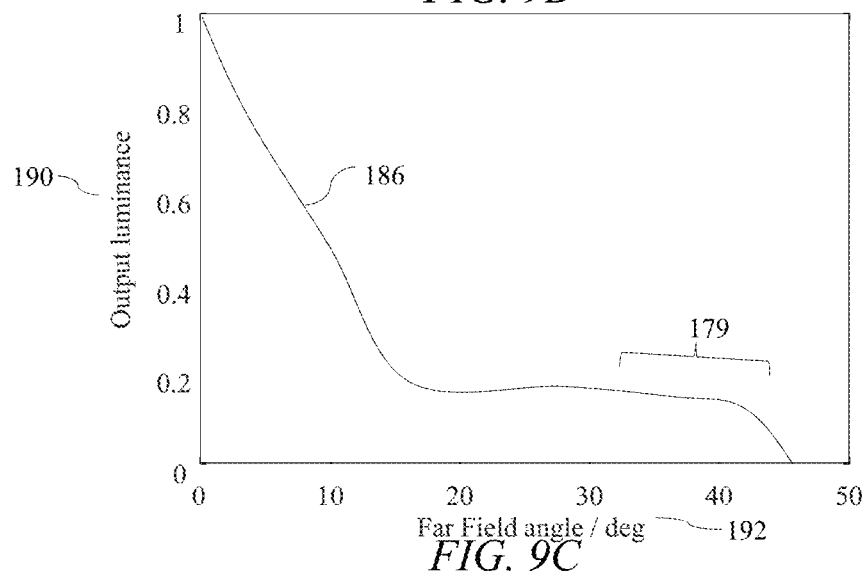
FIG. 9C is a schematic graph illustrating the profile of output luminance with illumination angle for the arrangement of FIG. 9A.

FIG. 9A is a schematic graph illustrating the variation of the difference between the angle of incidence and critical angle of principal rays against distance from the optical axis for a first combination of refractive indices respectively for a fixed difference; FIG. 9B is a schematic diagram illustrating in top view propagation of principal light rays in a solid catadioptric optical element that is provided with interface profile illustrated in FIG. 9A and FIG. 9C is a schematic graph illustrating the variation of output luminance with viewing angle for the arrangement of FIG. 9A. The first refractive index combination of TABLE 1 is used for illustrative purposes.

Thus, no discontinuity of the derivative of the difference 156 with respect to distance from optical axis is provided, that is all principal rays 307 are incident on the cross-sectional outer surface 46 at an offset of 2 degrees from the critical angle. In comparison to the embodiments of FIGS. 6A and 6B, the luminance from the outer interface 46 in the region 179 is substantially increased for an observer close to 45 degrees, and thus such a privacy display would have limited privacy performance.

Features of the arrangements of FIGS. 9A-C not discussed in further detail may be assumed to correspond to the features with equivalent reference numerals as discussed above, including any potential variations in the features.

Further structures and operation of illumination apparatuses with solid catadioptric optical elements 38 will now be described further.

Figure 10:
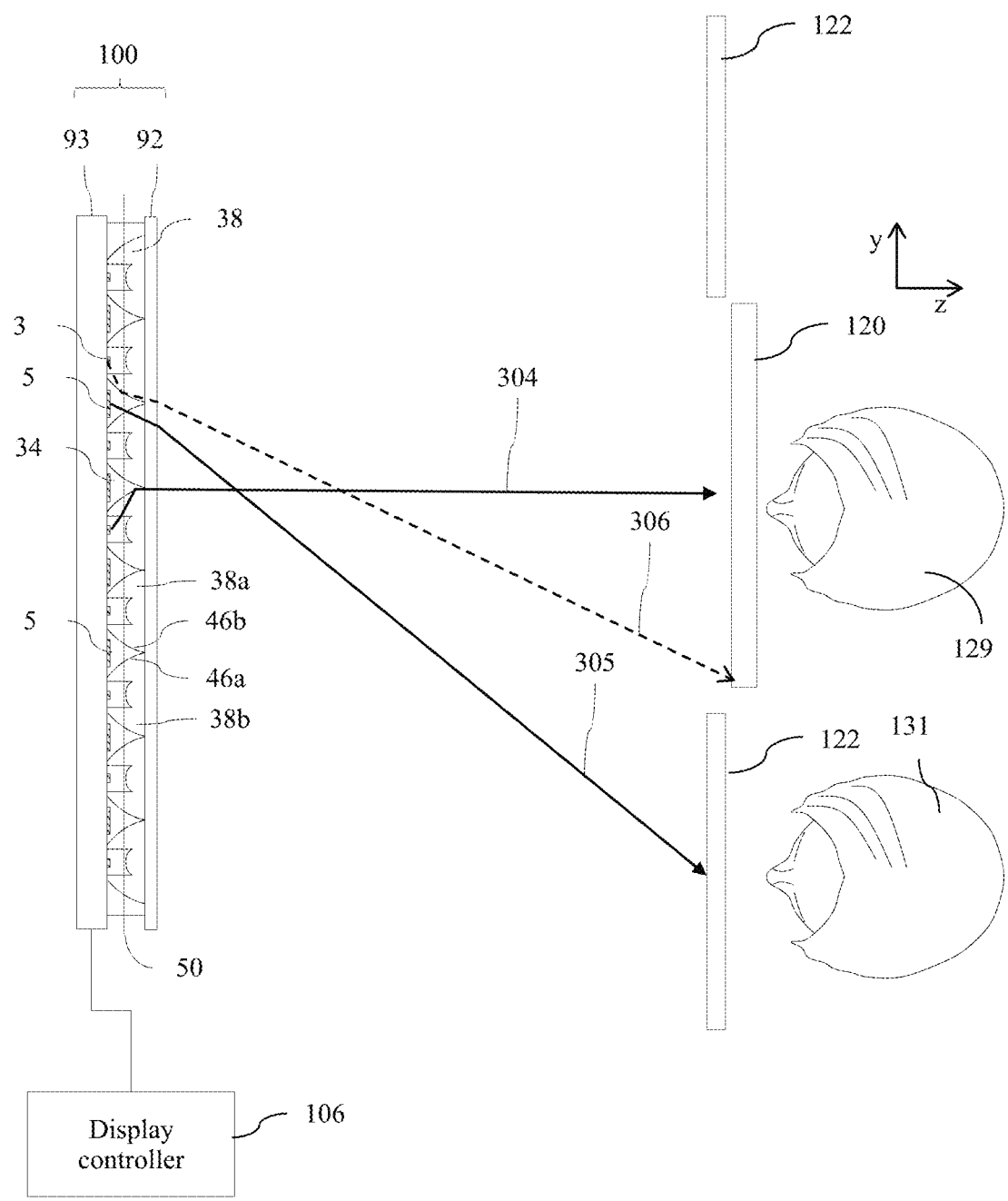
FIG. 10 is a schematic diagram illustrating in top view a switchable display apparatus comprising a solid catadioptric optical element and arranged to switch between narrow and wide directional distributions in a wide-angle mode of operation.

FIG. 10 is a schematic diagram illustrating in top view a switchable display apparatus 100 comprising a solid catadioptric optical element and arranged to switch between narrow and wide directional distributions in a wide-angle mode of operation, as described in GB1705364.6 and incorporated herein in its entirety by reference.

In comparison to FIG. 1A, further LEDs 5 are arranged on the backplane 93 in the regions between the second cross-sectional outer interface 46b of a first catadioptric optical element 38a and the first cross-sectional outer interface 46a of a second adjacent catadioptric optical element 38b. During a privacy mode of operation, only LEDs 3 are driven, whereas in the wide-angle mode of operation, LEDs 3 and LEDs 5 are illuminated to provide light rays 305 that are transmitted through the outer interfaces 46 of the catadioptric optical elements 38 to directional distributions 122 so that the image on the display 100 may be seen by adjacent observers 131.

Features of the arrangements of FIG. 10 not discussed in further detail may be assumed to correspond to the features with equivalent reference numerals as discussed above, including any potential variations in the features.

Figure 11A:
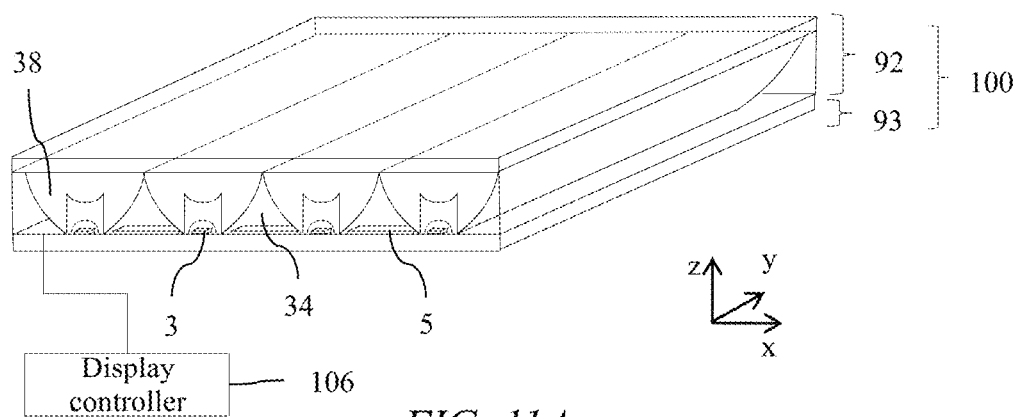
FIG. 11A is a schematic diagram illustrating in perspective front view a display apparatus comprising an extended array of solid catadioptric optical elements.

FIG. 11A is a schematic diagram illustrating in perspective front view a display apparatus comprising an extended array of solid catadioptric optical elements. Such an array may be used to provide a directional distribution with increased angular profile orthogonal to the y-axis in comparison to the directional distribution in the x-axis direction. Such a display may advantageously have wide viewing freedom for rotation about the x-axis direction. Further, tooling and replication of the linear catadioptric optical elements may be more conveniently provided, increasing manufacturing yield and reducing manufacturing cost.

Figure 11B:
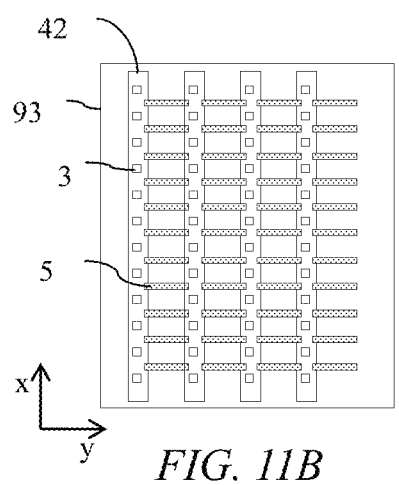
FIGS. 11B-C are schematic diagrams illustrating in top view a plurality of LEDs for the switchable directional display of FIG. 1A.
Figure 11C:
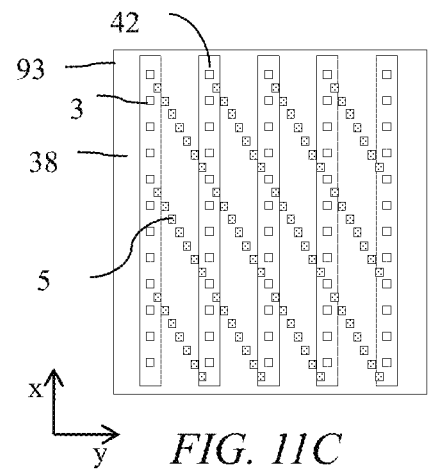

FIGS. 11B-11C are schematic diagrams illustrating in top view a plurality of LEDs for the switchable directional display of FIG. 10 in relation to the position of the interface 42 of the aligned catadioptric optical elements 38. Backplane 93 may comprise first array of micro-LEDs 3 and second array of LEDs 5. In FIG. 11B, the LEDs 5 are provided as a single LED between each column of micro-LEDs 3. Such elements are arranged to substantially fill the area between the columns of micro-LEDs 3. FIG. 11C illustrates another embodiment wherein the LEDs 5 are arranged as staggered columns of pixels. Advantageously increased control of output illumination may be achieved.

Figure 11D:
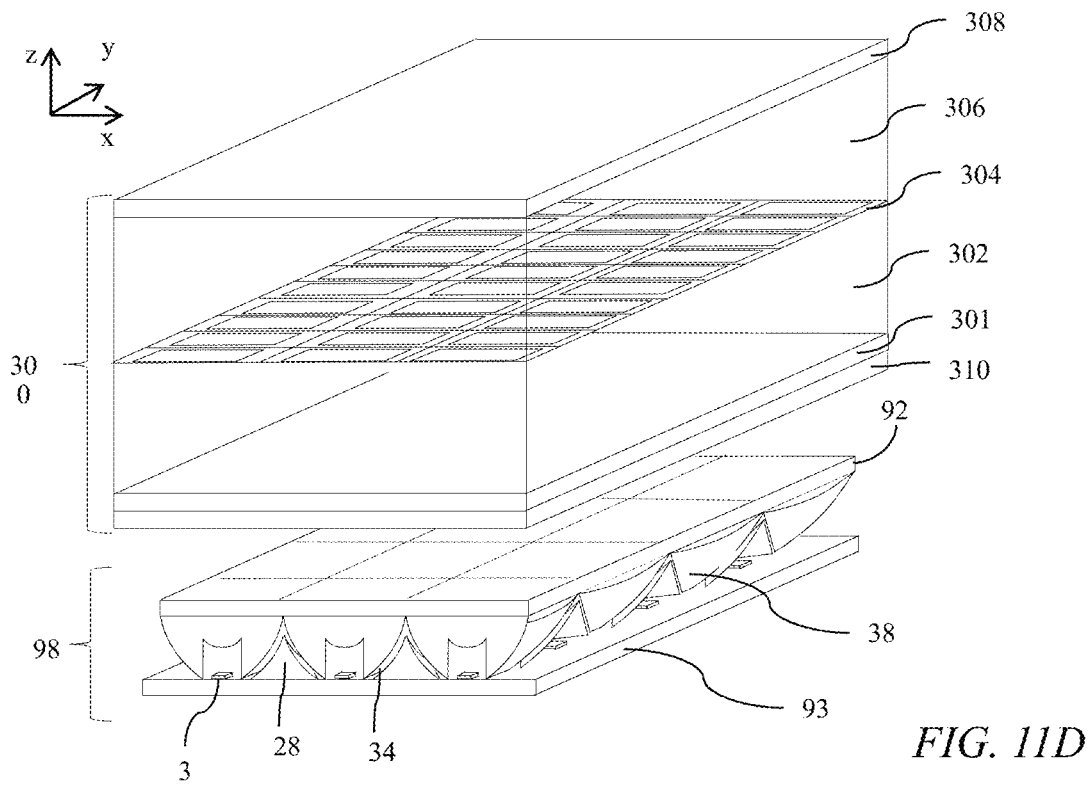
FIG. 11D is a schematic diagram illustrating in perspective front view a display apparatus comprising a two-dimensional array of solid catadioptric optical elements and switchable LED array arranged as a backlight to illuminate a liquid crystal display.

FIG. 11D is a schematic diagram illustrating in side perspective view a directional display apparatus comprising a backlight 98 with a two dimensional array of solid catadioptric optical elements 38 comprising first and second cross-sectional outer interface regions arranged to illuminate a spatial light modulator 300. LEDs 3 are aligned with the catadioptric optical elements 38 respectively. Advantageously a flexible backlight for a display such as a liquid crystal display can be made with high tolerance to water vapour and oxygen ingress, thermal expansion and environmental pressure changes.

Features of the arrangements of FIGS. 11A-D not discussed in further detail may be assumed to correspond to the features with equivalent reference numerals as discussed above, including any potential variations in the features.

FIGS. 12A-D are schematic diagrams illustrating in side views a method to form a plurality of light guides.

Figure 12A:
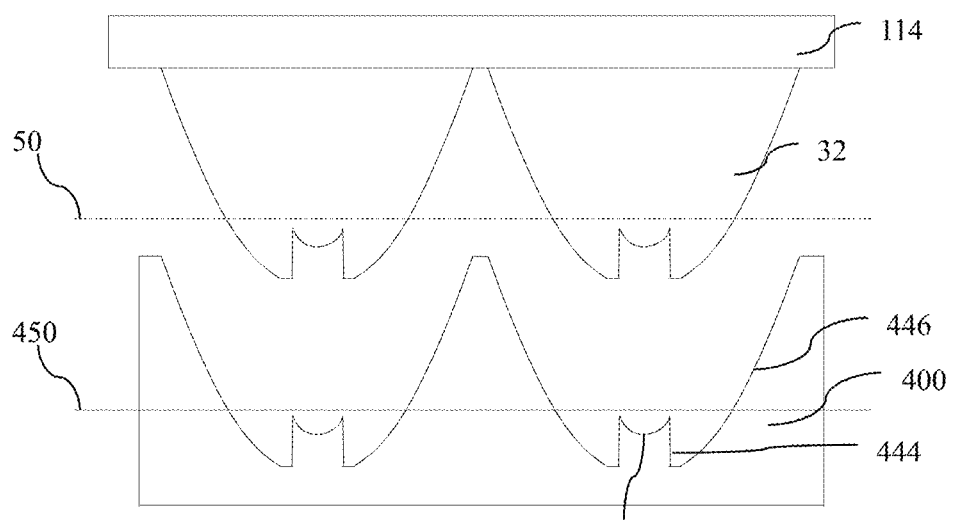
FIGS. 12A-D are schematic diagrams illustrating in side views a method to form an array of light guides.

In a first step as illustrated in FIG. 12A, a plurality of catadioptric surfaces is formed on a substrate 114 in a first transparent material 32 with first refractive index by moulding, UV casting, embossing or other known replication methods from a tool 400 that is formed with surfaces 442, 444, 446 with appropriate shapes including border 450 between first and second outer regions of surfaces 446 to form the solid catadioptric optical element 38 interfaces as described elsewhere herein.

Figure 12B:
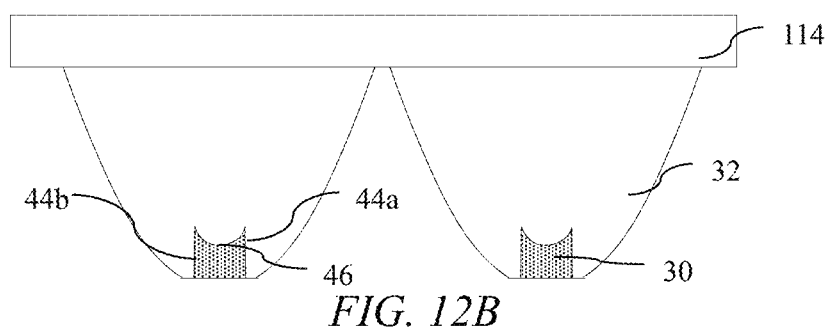

In a second step as illustrated in FIG. 12B, inner interfaces 42, 44a, 44b are formed by filling with transparent material 30 with a second refractive index, for example by inkjet droplet application.

Figure 12C:
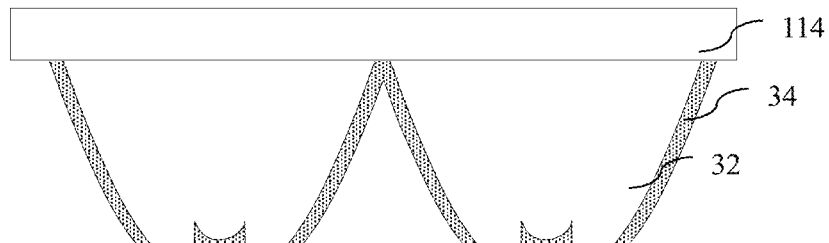

In a third step as illustrated in FIG. 12C, an outer coating material with material 34 is applied, for example by means of evaporation, dip coating or other known coating methods. Alternatively, the material 34 may be arranged to fill the region between the material 32.

Figure 12D:
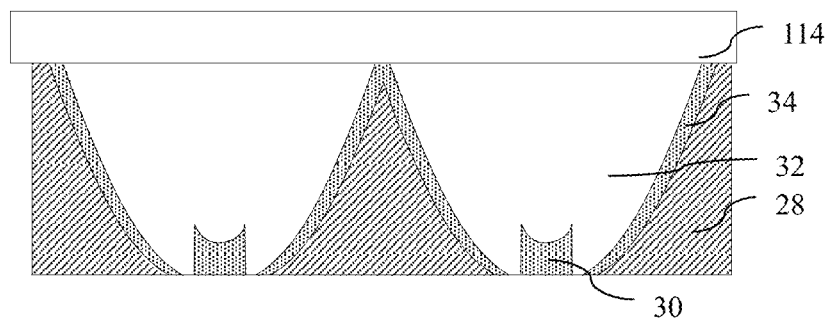

In a fourth step as illustrated in FIG. 12D a final planarization layer 28 may be provided to fill the region between the material 34.

Features of the arrangements of FIGS. 12A-D not discussed in further detail may be assumed to correspond to the features with equivalent reference numerals as discussed above, including any potential variations in the features.

The structure and operation of catadioptric optical elements will now be further described.

Figure 13:
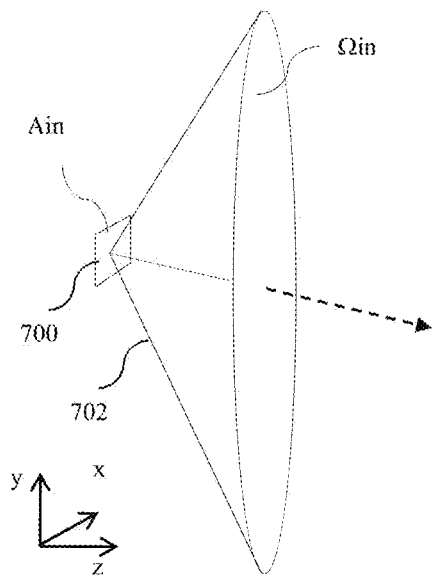
FIG. 13 is a schematic diagram illustrating in perspective view a light source with first area and first solid angle of light cone for input into an optical system.
Figure 14:
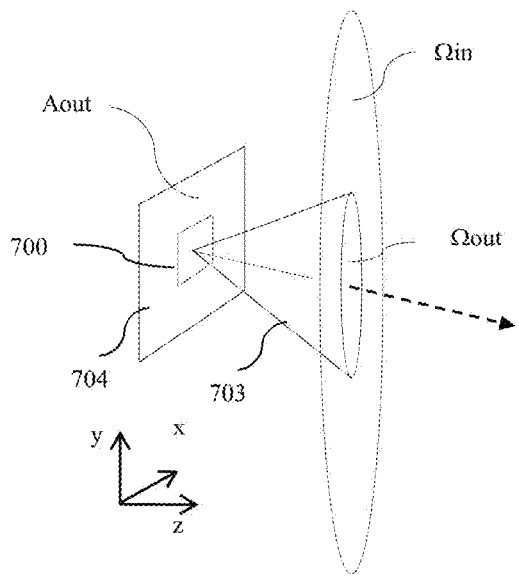
FIG. 14 is a schematic diagram illustrating in perspective view the area and solid angles for output light, after light from the light source of FIG. 13 has been directed by the optical system.

FIG. 13 is a schematic diagram illustrating in perspective view a light source 700 with first area Ain and first solid angle Ωin of light cone 702 for input into an unspecified optical structure (not shown); and FIG. 14 is a schematic diagram illustrating in perspective view the output interface 704 of area Aout and cone 703 of solid angle Ωout for output light after light rays from the light source of FIG. 13 has been directed by the optical structure. Conservation of brightness, or étendue, means that $$A\text{out}*\Omega\text{out}<=A\text{in}*\Omega\text{in} \quad \text{eqn. 1}$$

Figure 15:
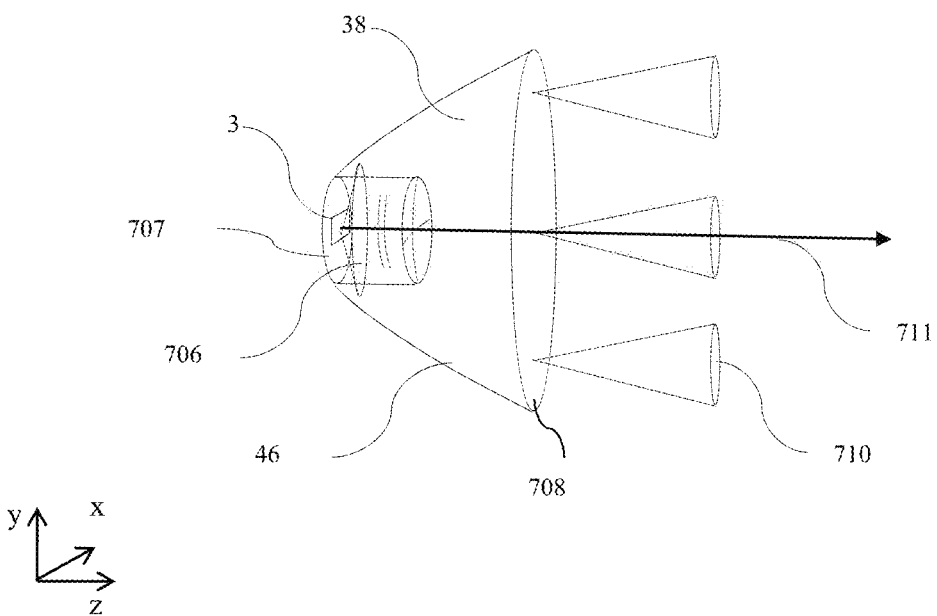
FIG. 15 is a schematic diagram illustrating in perspective view micro-LED area and solid angle and catadioptric optical element output area and solid angle.

FIG. 15 is a schematic diagram illustrating in perspective view a catadioptric optical element 38 with at a first end 707 a micro-LED 3 with an input area Ain and input solid angle Ωin in cone 706. Second end 708 of the catadioptric optical element 38 has area Aout and transmitted light cone 710 has solid angle Ωout. Equation 1 teaches that Aout is thus greater than Ain, thus in at least one dimension the output width of the catadioptric optical element is greater than the input width to provide the reduction in cone solid angle Ωout. Thus the smaller solid angle of cone 710 is achieved by increasing the output area Aout of second end 708 in comparison to the area of the micro-LED 3. The catadioptric optical element may be extended; then the width of the micro-LED 3 may be less than the width of the second end 708.

FIG. 15 further illustrates the optical axis 711 of a rotationally symmetric catadioptric optical element 38. In this embodiment, the optical axis 711 is a line along which there is rotational symmetry and is a line passing through centres of curvature of the refractive interface 42 and outer reflective interface 46 of the catadioptric optical element 38.

In embodiments in which the catadioptric optical element 38 is arranged to operate on-axis, the output luminance may be arranged to be provided in a direction normal to the output interface, for example normal to the transparent support substrate 47. In such embodiments, the optical axis 711 may be the axis of reflective symmetry of the refractive interface 42 and outer reflective interfaces 46a, 46b.

Features of the arrangements of FIGS. 13-15 not discussed in further detail may be assumed to correspond to the features with equivalent reference numerals as discussed above, including any potential variations in the features.

The arrangement and operation of catadioptric optical elements 38 will now be further described.

Figure 16:
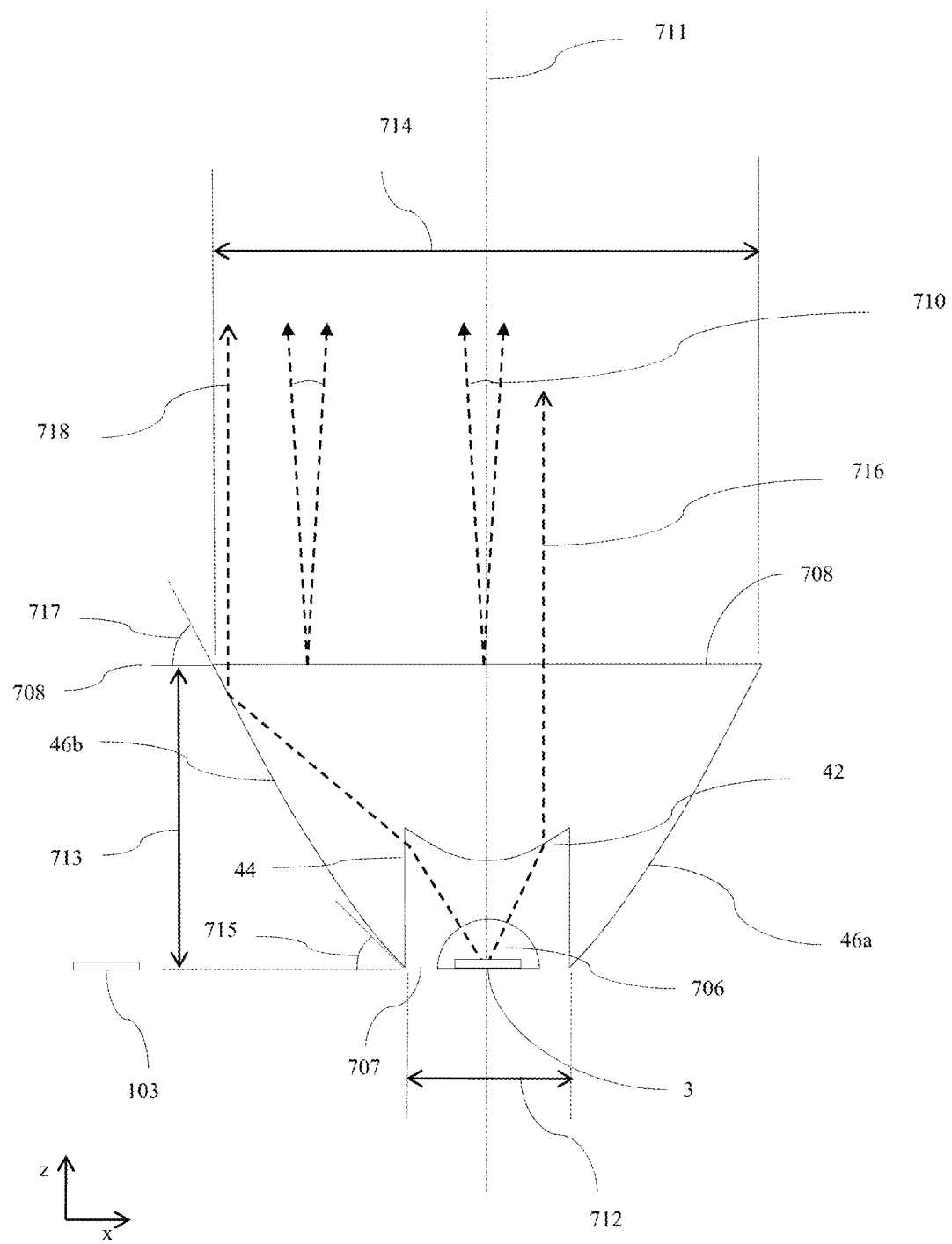
FIG. 16 is a schematic diagram illustrating in side view the input width and output width of a catadioptric optical element in at least one cross-sectional plane.

FIG. 16 is a schematic diagram illustrating in side view the input width 712 and output width 714 of a catadioptric optical element 38 in at least one cross-sectional plane through its optical axis 177. Thus the cross-sectional plane is the x-z plane and the optical axis 711 is in the cross-sectional plane.

Each of the catadioptric optical elements 38 of the plurality of catadioptric optical elements comprises, in at least one cross-sectional plane through its optical axis 711 a first outer interface 46a and a second outer interface 46b facing the first outer interface 46a. The first and second outer interfaces 46a, 46b extend from a first end 707 of the catadioptric optical element 38 to a second end 708 of the catadioptric optical element 38, the second end 708 of the catadioptric optical element 708 facing the first end 707 of the catadioptric element.

The distance 712 between the first and second outer interfaces 46a, 46b at the first end of the catadioptric optical element is less than the distance 714 between the first and second outer interfaces 46a, 46b at the second end 708 of the catadioptric optical element 38. At least one transparent inner interface 42, 44 is arranged between the first and second ends 707, 708 and between the first and second outer interfaces 46a, 46b.

End 708 may be provided by an output interface of the catadioptric optical element 38, or may be for example arranged in a layer of a moulded optical component, for example on transparent support substrate 92 of FIG. 1A.

Each of the catadioptric optical elements 38 of the plurality of catadioptric optical elements is aligned in correspondence with a respective one or more of the LEDs 3 of the first plurality of LEDs, each of the LEDs of the first plurality of LEDs being aligned with only a respective one of the catadioptric optical elements of the plurality of catadioptric optical elements. The alignment in correspondence between a catadioptric optical element 38 of the plurality of catadioptric elements and its respective one or more of the LEDs 3 of the first plurality of LEDs comprising the respective one or more of the LEDs 3 of the first plurality of LEDs is by being positioned at the first end 707 of the catadioptric optical element 38 and aligned with the catadioptric optical element 38.

The LEDs 3 may be positioned at the first end 707 of the catadioptric optical element 38 and between the at least one transparent inner interface 42, 44 of the catadioptric optical element 38 and aligned with the catadioptric optical element. For example, in the cross-sectional plane the centre of the micro-LED 3 may be aligned with the optical axis 711 of the catadioptric optical element. In the present disclosure the terminology "at the first end of" the catadioptric optical element includes, for example, the micro-LED being a small amount under the first end 707, in the same plane as the end 707 of the catadioptric optical element 38, or in the vicinity of the end 707, or in the proximity of the end 707 or adjacent the end. In each case this may include aligned with the optical axis of the catadioptric optical element. The above description can be applied to all the embodiments.

A catadioptric optical structure uses both reflection and refraction of light. Further, a catadioptric optical structure is one where refraction and reflection are combined in an optical structure, usually via lenses (dioptrics) and curved mirrors (catoptrics). Catadioptric optical elements are sometimes referred to as RXI optical elements. An RXI optical element produces ray deflections by refraction (R), reflection from metals (X), and total internal reflection (I).

The first and second outer interfaces 46a, 46b each comprise curved interfaces that extend from a first end 707 of the catadioptric optical element to the second end 708 of the catadioptric optical element 38, the second end 708 of the catadioptric optical element facing the first end 707 of the catadioptric optical element 38. Further the transparent inner interface 42, 44 comprises at least one curved interface 42. The exterior angle 715 between the first end 707 and the first outer interface 46a at the first end 707 may be less than the exterior angle 717 between the first end 707 and the first outer interface 46a at the second end 708. Further the exterior angle between the first end 707 and the second outer interface 46b at the first end 707 is less than the exterior angle between the first end 707 and the second outer interface 46b at the second end 708.

Advantageously collimated light may be provided with a directional light output distribution that has a narrow cone angle.

The catadioptric optical element 38 may be arranged to provide substantially collimated output light from the micro-LED 3 for light that is incident on the curved outer interfaces 46a, 46b and the at least one of the transparent inner interface 44 which may have positive optical power. Further at least one of the transparent inner interfaces 42, 44 may have zero optical power. Advantageously interfaces 44 may be conveniently provided during tooling and moulding steps of manufacture. Further, such interfaces may cooperate to provide collimated light for all light rays from LED 3 over a high output solid angle, as will be described below with reference to FIG. 19 in comparison to FIGS. 4A and 4B.

Thus some of the light output illustrated by ray 718 of LEDs 3 of the first plurality of LEDs is transmitted by the at least one transparent inner interface 44 before it is reflected at the first or second outer interfaces 46a, 46b and directed into the first directional light output distribution 120; and some of the light output illustrated by ray 716 of LEDs 3 of the first plurality of LEDs is transmitted by the at least one transparent inner interface 42 and directed into the first directional light output distribution 120 without reflection at the first or second outer interfaces 46a, 46b.

FIG. 16 further illustrates that a refractive optical element 706 may be provided between the micro-LEDs 3 of the first plurality of LEDs and the at least one transparent inner interface 42, 44. The refractive optical element 706 may a hemispherical lens that is arranged to achieve increased efficiency of light output coupling from the high index materials that are typically used for inorganic micro-LEDs 3. The hemispherical lens 706 increases the effective area Ain of the source 9 comprising the LED and hemispherical lens 706, so the light from the micro-LED 3 is distributed over a larger cone angle than would be provided by the micro-LED 3 alone.

Advantageously, higher efficiency output coupling may be provided.

In at least one cross-sectional plane, the present embodiments provide a reduction in the width of the output directional light output distribution to provide directionality with a directional light output distribution (as described by solid angle Ωout) that is smaller than the input directional light output distribution (as described by solid angle Ωin) by the catadioptric optical element.

Features of the arrangements of FIG. 16 not discussed in further detail may be assumed to correspond to the features with equivalent reference numerals as discussed above, including any potential variations in the features.

It may be desirable to provide an off-axis illumination from the catadioptric optical elements.

By way of comparison known display backlights may use large area edge input light guides and optical films such as BEF from 3M Corporation and rear reflectors. Such backlights may typically have a thickness less than 8 mm, and more typically around 4 mm. The micro-optics of the present embodiments may provide reduced thickness backlights compared to conventional backlights using area light guides. Further direct displays may be provided with low thickness compared to backlit LCDs and similar to the thickness that can be achieved by OLED displays.

Figure 17:
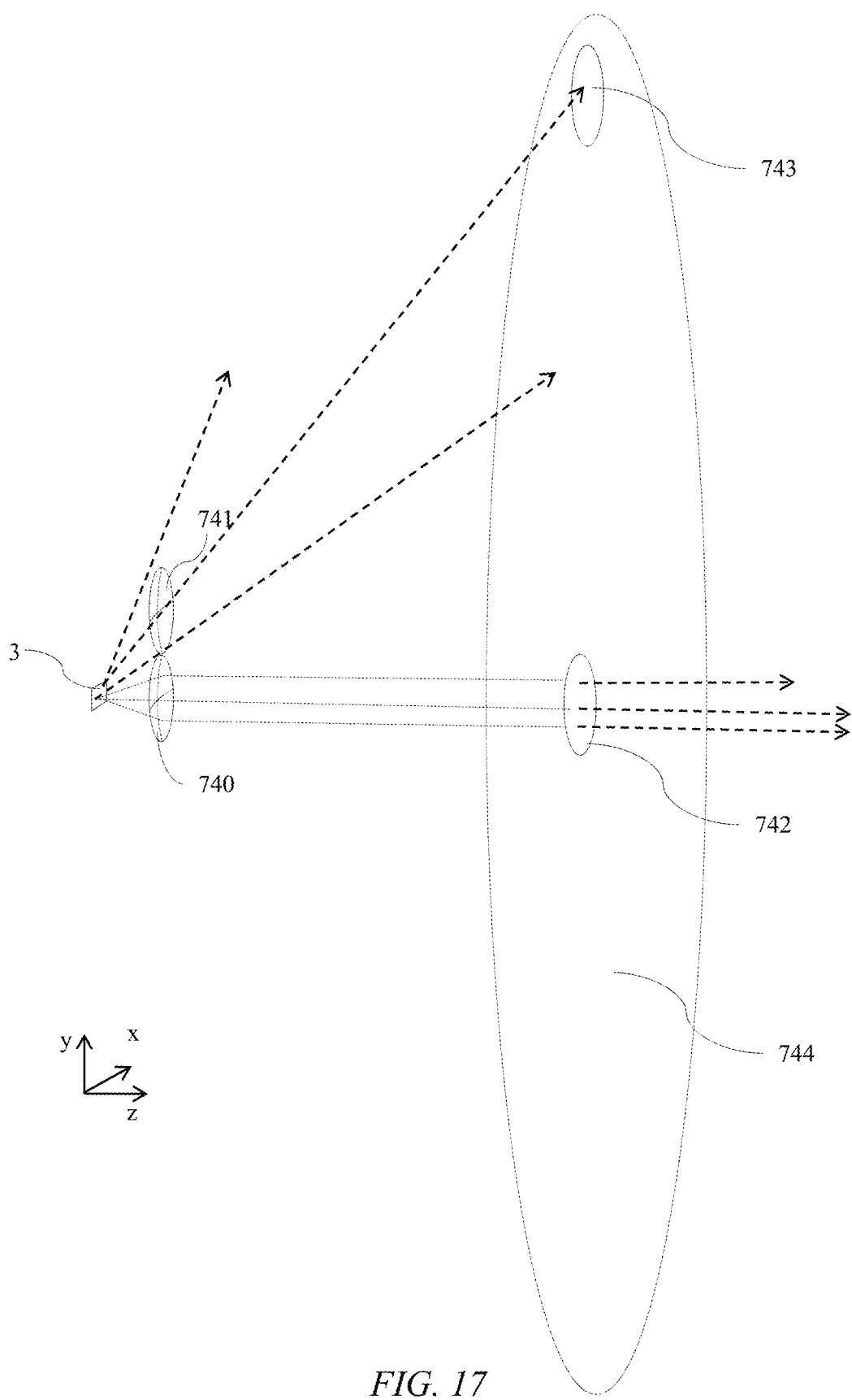
FIG. 17 is a schematic diagram illustrating in perspective view, illumination by a refractive optical element providing a background glow and a central spot beam.

FIG. 17 is a schematic diagram illustrating in perspective view illumination by a plurality of refractive optical elements 740, 741 providing a background glow 744 and central spot beams, 742, 743. Background glow 744 may be provided by light that propagates outside the refractive optical elements 740, and may have a directional light output distribution that is similar to the input light source that may be for example a micro-LED 3. The glow 744 may disadvantageously provide stray light that degrades the quality of illumination, for example increasing background privacy level for unauthorised viewers, and degrading privacy performance. Further additional spot beams 743 with high luminance may undesirably be provided.

Figure 18:
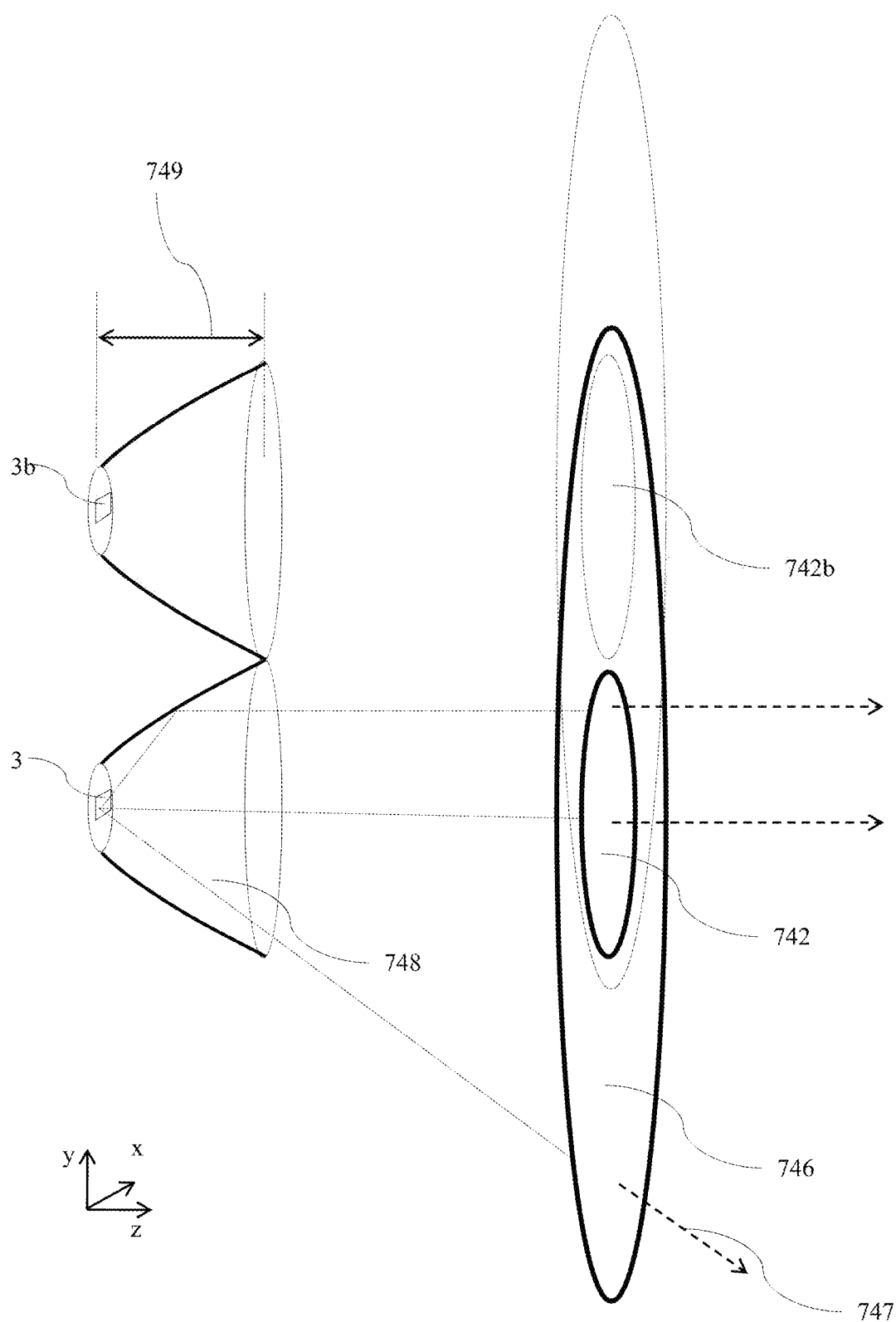
FIG. 18 is a schematic diagram illustrating in perspective view, illumination by a reflective optical element providing an outer halo and a central spot beam.

FIG. 18 is a schematic diagram illustrating in perspective view illumination by a plurality of reflective optical elements providing an outer halo 746 and a central spot beam 742. In comparison to the arrangement of FIG. 17, the additional spot beam 743 may not be present, however undesirably the halo 746 distributes light over a wider area and degrades background illuminance level, for example reducing privacy performance. The size of the halo 746 may be reduced by increasing the length 749 of the reflective optic, however such increases device thickness.

Figure 19:
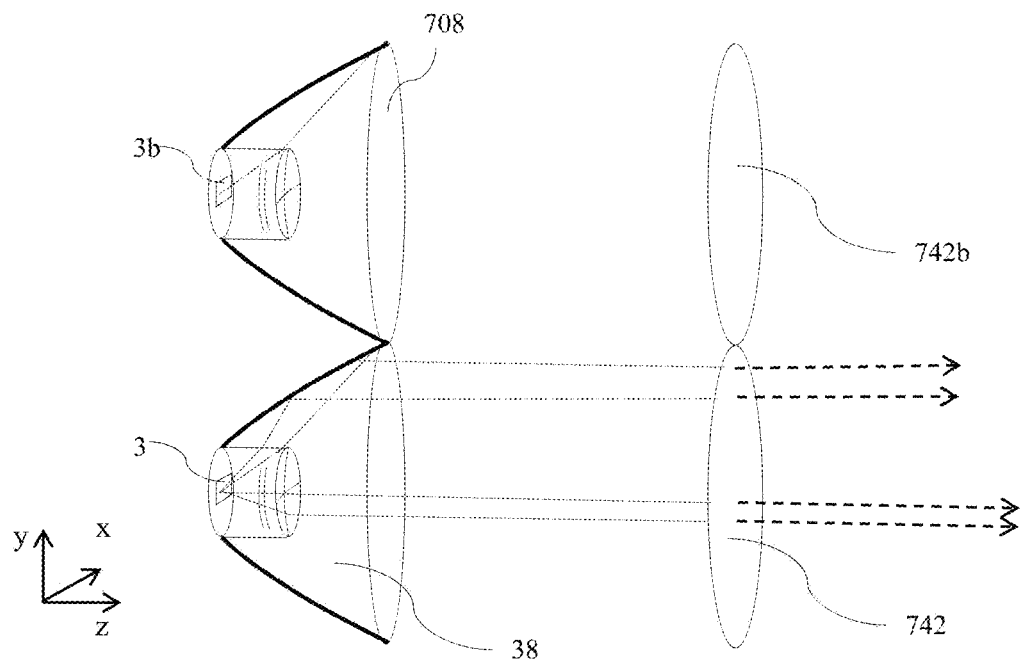
FIG. 19 is a schematic diagram illustrating in perspective view illumination by a catadioptric optical element providing a central spot beam.

FIG. 19 is a schematic diagram illustrating in perspective view illumination by a plurality of catadioptric optical elements providing a central spot beam. In comparison to the arrangements of FIGS. 17,18, the background glow 744 or halo 746 are not present. Advantageously, low stray light can be provided in a thin package.

Features of the arrangements of FIGS. 17-19 not discussed in further detail may be assumed to correspond to the features with equivalent reference numerals as discussed above, including any potential variations in the features.

A method to form an illumination apparatus will now be further described.

FIGS. 20A-D are schematic diagrams illustrating in perspective views a method to form an illumination apparatus 110 comprising a plurality of micro-LEDs 3 and a plurality of catadioptric optical elements 38 as described in US patent application U.S. Pat. No. 8,985,810 and incorporated by reference herein in its entirety.

Figure 20A:
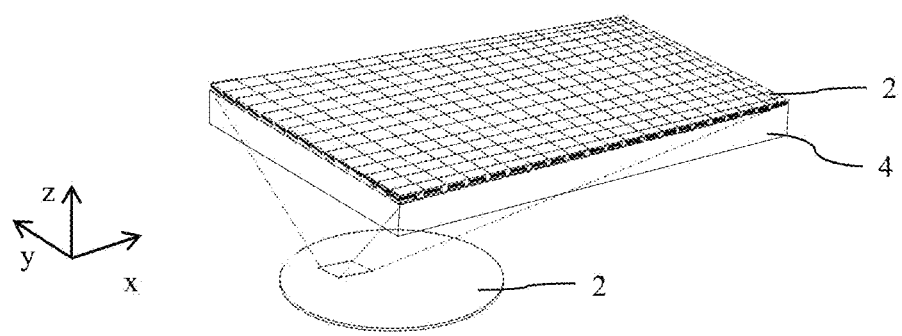
FIGS. 20A-D are schematic diagrams illustrating in perspective views a method to form an illumination apparatus comprising an array of LEDs and an array of catadioptric optical elements.

As illustrated in FIG. 20A, the monolithic wafer 2 that may be gallium nitride for example and may be formed on a substrate 4 that may be sapphire for example.

Figure 20B:
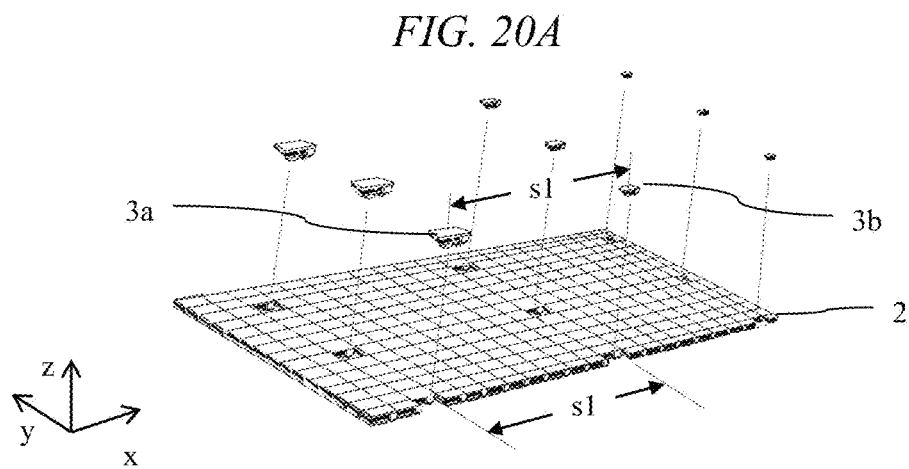

As illustrated in FIG. 20B, a non-monolithic array of micro-LEDs 3 may be extracted from the monolithic wafer 2 to provide micro-LEDs 3a, 3b with separation s1.

Figure 20C:
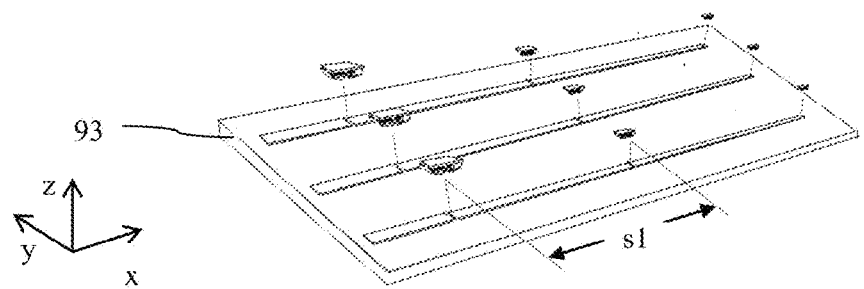

As illustrated in FIG. 20C, micro-LEDs 3a, 3b may be arranged on substrate 93 in alignment with electrodes and other optical elements (not shown).

Figure 20D:
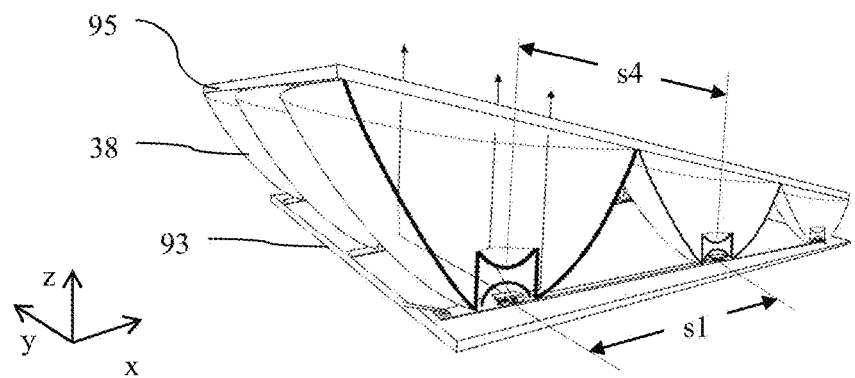

As illustrated in FIG. 20D, the substrate 93 may be aligned with a plurality of catadioptric optical elements 38 with separations s4 to provide an illumination apparatus, such that separation s4 may be the same as separation s1. Advantageously large numbers of elements may be formed over large areas using small numbers of extraction steps, while preserving alignment to a respective array of optical elements.

Thus the LEDs may be from a monolithic wafer 2 arranged in an array with their original monolithic wafer positions and orientations relative to each other preserved; and wherein in at least one direction, for at least one pair of the plurality of LEDs in the at least one direction, for each respective pair there was at least one respective LED in the monolithic wafer that was positioned in the monolithic wafer between the pair of LEDs in the at least one direction and that is not positioned between them in the array of LEDs.

Figure 20E:
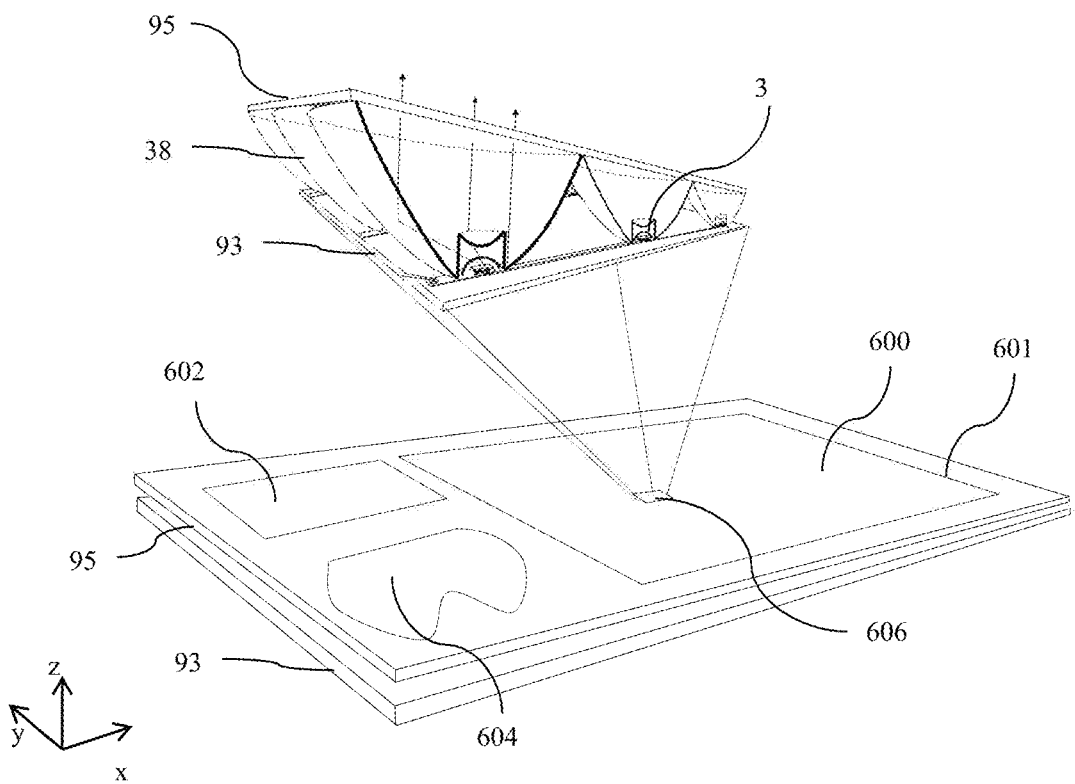
FIG. 20E is a schematic diagram illustrating in perspective view singulation of an illumination apparatus, in accordance with the present disclosure.

FIG. 20E is a schematic diagram illustrating in perspective view singulation of an illumination apparatus. FIG. 20E illustrates that illumination apparatuses with desirable directional light output distribution characteristics can be singulated from large area substrates 93, 47, for example to provide different size elements 600, 602 or different shape elements 604. Further device seal lines 601 may be provided at the edge of each element to provide hermetic sealing of the optical elements, and reduce dust and other material ingress into the optical elements during use.

Features of the arrangements of FIGS. 20A-E not discussed in further detail may be assumed to correspond to the features with equivalent reference numerals as discussed above, including any potential variations in the features.

The words "substantially" and "approximately", as may be used in this disclosure provide a tolerance which is accepted in the industry for its corresponding word and/or relativity between items. Such an industry-accepted tolerance ranges from zero to ten percent and corresponds to, but is not limited to, lengths, positions, angles, etc. Such relativity between items ranges between approximately zero to ten percent.

Embodiments of the present disclosure may be used in a variety of optical structures. The embodiment may include or work with a variety of lighting, backlighting, optical components, displays, tablets and smart phones for example. Aspects of the present disclosure may be used with practically any apparatus related to displays, environmental lighting, optical devices, optical systems, or any apparatus that may contain any type of optical system. Accordingly, embodiments of the present disclosure may be employed in displays, environmental lighting, optical systems and/or devices used in a number of consumer professional or industrial environments.

It should be understood that the disclosure is not limited in its application or creation to the details of particular arrangements illustrated, because the disclosure is capable of other embodiments. Moreover, aspects of the disclosure may be set forth in different combinations and arrangements to define embodiments unique in their own right. Also, the terminology used in this disclosure is for the purpose of description and not of limitation.

While embodiments in accordance with the principles that are disclosed herein have been described, it should be understood that they have been presented by way of example only, and not limitation. Therefore, the breadth and scope of this disclosure should not be limited by any of the exemplary embodiments described, but should be defined only in accordance with any claims and their equivalents issuing from this disclosure. In addition, the above advantages and features are provided in described embodiments, but shall not limit the application of such issued claims to processes and structures accomplishing any or all of the above advantages.

The section headings herein are included to provide organizational cues. These headings shall not limit or characterise the embodiments set out in any claims that may issue from this disclosure. To take a specific example, although the headings refer to a "Technical Field," the claims should not be limited by the language chosen under this heading to describe the field. Further, a description of technology in the "Background" is not to be construed as an admission that certain technology is prior art to any embodiment in this disclosure. Neither is the "Summary" to be considered as a characterization of the embodiments in issued claims. Furthermore, any reference in this disclosure to "invention" in the singular should not be used to argue that there is merely one point of novelty in this disclosure. Multiple embodiments may be set forth according to the limitations of the multiple claims issuing from this disclosure, and such claims define the embodiments, and their equivalents, that are protected by them. In all instances, the scope of claims shall be considered on their own merits in the light of this disclosure, and should not be constrained by the headings used in this disclosure.

The invention claimed is:

1. An illumination apparatus, comprising:
   a plurality of LEDs, the plurality of LEDs being arranged in an LED array, wherein the LEDs of the plurality of LEDs are micro-LEDs;
   a catadioptric optical structure aligned with the LEDs of the plurality of LEDs to provide a directional light output distribution, the directional light output distribution being of light output from the LEDs of the plurality of LEDs;
   wherein the catadioptric optical structure comprises a plurality of catadioptric optical elements arranged in a catadioptric optical element array, each of the catadioptric optical elements of the plurality of catadioptric optical elements aligned in correspondence with a respective one or more of the LEDs of the plurality of LEDs, each of the LEDs of the plurality of LEDs being aligned with only a respective one of the catadioptric optical elements of the catadioptric optical structure;
   wherein each of the plurality of catadioptric optical elements comprises in at least one catadioptric cross-sectional plane through its optical axis:
   a first cross-sectional outer interface and a second cross-sectional outer interface facing the first cross-sectional outer interface;
   wherein the first and second cross-sectional outer interfaces each comprise curved interfaces comprising first and second outer interface regions;
   wherein the first and second cross-sectional outer interfaces extend from a first end of the catadioptric optical element to a second end of the catadioptric optical element, the second end of the catadioptric optical element facing the first end of the catadioptric element;
   wherein the distance between the first and second cross-sectional outer interfaces at the first end of the catadioptric optical element is less than the distance between the first and second cross-sectional outer interfaces at the second end of the catadioptric optical element; and
   at least one transparent inner interface arranged between the first and second ends and between the first and second outer interfaces;
   wherein the catadioptric optical structure comprises:
   (i) a first transparent non-gaseous material with a first refractive index arranged between the first and second cross-sectional outer interfaces and the at least one transparent inner interface and between the first and second end of each of the catadioptric optical elements;
   (ii) a second transparent non-gaseous material with a second refractive index lower than the first refractive index arranged between a respective aligned LED and the transparent inner interface of each of the catadioptric optical elements;
   (iii) a third transparent non-gaseous material with a third refractive index lower than the first refractive index arranged between the first cross-sectional outer interface of a first catadioptric optical element and the second cross-sectional outer interface of an adjacent catadioptric optical element of the plurality of catadioptric optical elements and between the first and second end of each of the catadioptric optical elements;
   wherein the tilt angle with respect to the optical axis of an interface normal of each of the first and second cross-sectional outer interfaces varies continuously with the distance from the first end towards the second end; and a derivative of the tilt angle with respect to distance from the optical axis has a discontinuity at a boundary between the respective first and second outer interface regions of the first and second cross-sectional outer interfaces;
   wherein principal light output rays from the respective aligned LEDs are provided at the first end and at the optical axis of the respective catadioptric optical element, are transmitted through an inner interface, and are incident on a cross-sectional outer interface, each principal light ray having an angle of incidence at the curved cross-sectional outer interface;
   wherein a derivative of a difference between an angle of incidence of each principal light ray and a critical angle at the first and second outer interfaces with respect to distance from the optical axis has a discontinuity at the boundary between the first and second outer interface regions; and
   wherein the difference between the angle of incidence of each principal light ray and the critical angle is a constant across the first outer interface region and the difference between the angle of incidence of each principal light ray and the critical angle monotonically increases across the second outer interface region.

2. An illumination apparatus according to claim 1 wherein the first outer interface region is arranged to reflect principal light output rays in off-axis directions and the second outer interface region is arranged to reflect principal light output rays in on-axis directions.

3. An illumination apparatus according to claim 2 wherein the principal rays are reflected by total internal reflection at the cross-sectional outer interfaces between the first and second end of each catadioptric optical element.

4. An illumination apparatus according to claim 1 wherein the third transparent material is formed as a layer on the first and second cross-sectional outer interfaces of the plurality of catadioptric optical elements.

5. An illumination apparatus according to claim 4 wherein a filler material with a fourth refractive index different to the third refractive index is arranged to fill the region between the third transparent material formed as a layer on the first and second cross-sectional outer interfaces.

6. An illumination apparatus according to claim 1 wherein a height from the first end of the first and second outer interfaces increases monotonically between the first and second end of the catadioptric optical element;
   the tilt angle with respect to the optical axis of the interface normal of each of the first and second cross-sectional outer interfaces increases monotonically between the first and second end of each catadioptric optical element.

7. An illumination apparatus according to claim 1 wherein in the first outer interface region, reflected principal light rays are output through the second end in directions different to the optical axis direction and in the second outer interface region reflected principal light rays are output through the second end substantially parallel to the optical axis.

8. An illumination apparatus according to claim 1 wherein the first outer interface region is arranged between the first end and the second outer interface region and the second outer interface region is arranged between the second end and the first outer interface region.

9. An illumination apparatus according to claim 1 wherein the third transparent material is arranged to fill the region between the first cross-sectional outer interface of a first catadioptric optical element and the second cross-sectional outer interface of an adjacent catadioptric optical element of the plurality of catadioptric optical elements and between the first and second end of the respective catadioptric optical elements.

10. An illumination apparatus according to claim 1 wherein gas and/or water vapour barrier layers are formed between the plurality of LEDs and outer surfaces of the illumination apparatus.

11. An illumination apparatus according to claim 1 wherein the micro-LEDs are organic LEDs.

12. An illumination apparatus according to claim 1 wherein the LEDs are from a monolithic wafer arranged in an array with their original monolithic wafer positions and orientations relative to each other preserved; and wherein in at least one direction, for at least one pair of the plurality of LEDs in the at least one direction, for each respective pair there was at least one respective LED in the monolithic wafer that was positioned in the monolithic wafer between the pair of LEDs in the at least one direction and that is not positioned between them in the array of LEDs.

13. An illumination apparatus according to claim 1 wherein the LEDs of the plurality of LEDs are micro-LEDs of width or diameter less than 200 microns.

14. An illumination apparatus according to claim 1 wherein in the at least one catadioptric cross-sectional plane the distance between the first and second outer interfaces at the second end of the catadioptric optical element is less than 600 microns.

15. An illumination apparatus according to claim 1 wherein the first refractive index is greater than 1.49 and the third refractive index is less than 1.42.

16. An illumination apparatus according to claim 1 wherein in the at least one catadioptric cross-sectional plane wherein at least one of the transparent inner interfaces has positive optical power.

17. A direct display apparatus comprising a switchable illumination apparatus of claim 1; and a control circuit comprising means to drive the plurality of LEDs with image pixel data.

18. A backlit display apparatus comprising the illumination apparatus of claim 1 and a spatial light modulator.

* * * * *